United States Patent
Zhu et al.

(10) Patent No.: US 12,302,217 B2
(45) Date of Patent: *May 13, 2025

(54) CONTROLLING DATA COMMUNICATION QUALITY IN SOFTWARE-DEFINED HETEROGENOUS MULTI-HOP AD HOC NETWORKS

(71) Applicant: TrellisWare Technologies, Inc., San Diego, CA (US)

(72) Inventors: Hua Zhu, San Diego, CA (US); Cenk Köse, San Diego, CA (US); Mark Johnson, San Diego, CA (US); Keith M. Chugg, La Cañada, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,772

(22) Filed: Apr. 10, 2023

(65) Prior Publication Data
US 2024/0080747 A1 Mar. 7, 2024

Related U.S. Application Data

(63) Continuation of application No. 17/588,746, filed on Jan. 31, 2022, now Pat. No. 11,627,516, which is a
(Continued)

(51) Int. Cl.
| | |
|---|---|
| *H04W 4/00* | (2018.01) |
| *H04B 7/026* | (2017.01) |
| *H04K 3/00* | (2006.01) |
| *H04W 24/06* | (2009.01) |
| *H04W 24/08* | (2009.01) |
| *H04W 40/16* | (2009.01) |
| *H04W 40/22* | (2009.01) |

(Continued)

(52) U.S. Cl.
CPC ............ *H04W 40/26* (2013.01); *H04B 7/026* (2013.01); *H04K 3/255* (2013.01); *H04W 24/06* (2013.01);
(Continued)

(58) Field of Classification Search
None
See application file for complete search history.

(56) References Cited

U.S. PATENT DOCUMENTS

| | | | |
|---|---|---|---|
| 5,537,434 | A | 7/1996 | Persson et al. |
| 9,967,206 | B1 | 5/2018 | Thommana et al. |
| | | (Continued) | |

FOREIGN PATENT DOCUMENTS

| | | |
|---|---|---|
| CN | 107920341 A | 4/2018 |
| EP | 2899931 | 7/2015 |

OTHER PUBLICATIONS

Extended European Search Report mailed Sep. 7, 2022 for European Patent Application No. 20745499.2.
(Continued)

*Primary Examiner* — Bob A Phunkulh
(74) *Attorney, Agent, or Firm* — Perkins Coie LLP

(57) ABSTRACT

Methods, devices and systems that use a control channel to coordinate quality of data communications in software-defined heterogenous multi-hop ad hoc networks are described. In some embodiments, an example apparatus for wireless communication in a network includes performing, using a control plane, network management functions over a control channel that has a first bandwidth, implements a frequency-hopping operation, and operates at in a first frequency band, and performing, using a data plane that is physically and logically decoupled from the control plane, data forwarding functions, based on a routing decision, over at least one data channel that has a second bandwidth and operates in a second frequency band different from the first frequency band.

20 Claims, 17 Drawing Sheets

Related U.S. Application Data continuation of application No. 16/749,891, filed on Jan. 22, 2020, now Pat. No. 11,240,731.

(60) Provisional application No. 62/903,654, filed on Sep. 20, 2019, provisional application No. 62/795,518, filed on Jan. 22, 2019.

(51) Int. Cl.
| | | |
|---|---|---|
| *H04W 40/26* | (2009.01) | |
| *H04L 27/20* | (2006.01) | |
| *H04W 84/18* | (2009.01) | |

(52) U.S. Cl.
CPC ........... *H04W 24/08* (2013.01); *H04W 40/16* (2013.01); *H04W 40/22* (2013.01); *H04L 27/2003* (2013.01); *H04W 84/18* (2013.01)

(56) References Cited

U.S. PATENT DOCUMENTS

| | | |
|---|---|---|
| 2009/0257413 A1 | 10/2009 | Smith et al. |
| 2013/0065534 A1 | 3/2013 | Nejad et al. |
| 2016/0269206 A1 | 9/2016 | Shen et al. |
| 2017/0070387 A1 | 3/2017 | Rao et al. |
| 2017/0111952 A1 | 4/2017 | Choi |
| 2017/0280365 A1 | 9/2017 | Wang et al. |
| 2018/0035436 A1* | 2/2018 | Sharma ................. H04W 16/14 |
| 2018/0102883 A1 | 4/2018 | Amini et al. |
| 2018/0310301 A1 | 10/2018 | Amini et al. |
| 2019/0166523 A1* | 5/2019 | Shaw .................... H04W 76/20 |
| 2019/0394787 A1* | 12/2019 | Mashino ............... H04W 16/28 |
| 2021/0007010 A1* | 1/2021 | Wen ...................... H04W 72/56 |

OTHER PUBLICATIONS

International Search Report and Written Opinion mailed on Apr. 24, 2020 for International Patent Application No. PCT/US2020/014653, of TrellisWare Technologies, Inc., 9 pages.

Ku et al., "Software-Defined Mobile Cloud: Architecture Services and Use Cases," 2014 International Wireless Communications and Mobile Computing Conference (IWCMC), IEEE (publication date: Aug. 4, 2014).

Examination Report mailed Feb. 27, 2025 for European Patent Application No. 20745499.2, 7 pages.

* cited by examiner

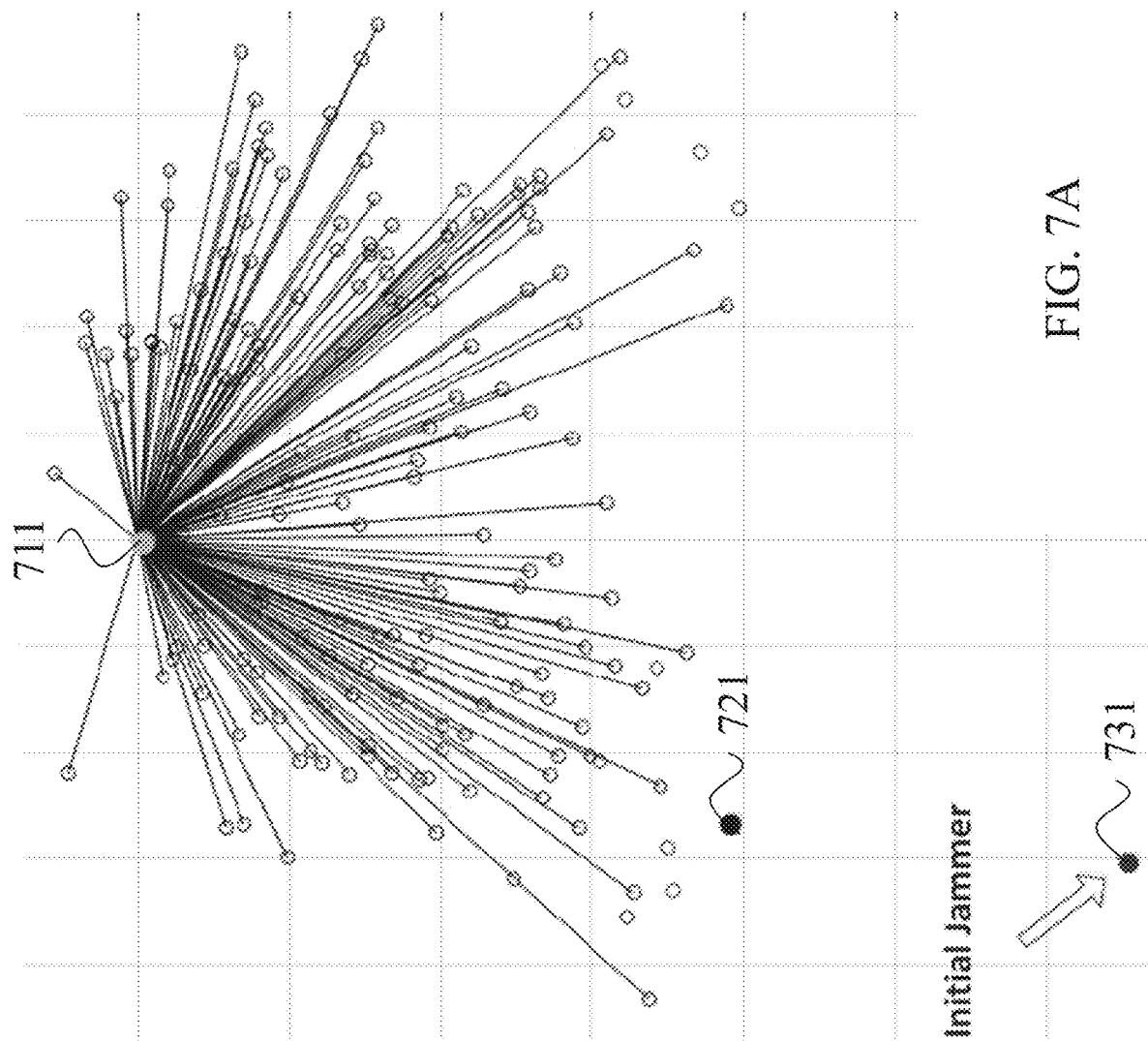

CONTROLLING DATA COMMUNICATION QUALITY IN SOFTWARE-DEFINED HETEROGENOUS MULTI-HOP AD HOC NETWORKS

CROSS-REFERENCE TO RELATED APPLICATIONS

This patent document is a continuation of U.S. patent application Ser. No. 17/588,746 filed Jan. 31, 2022, which is a continuation of U.S. patent application Ser. No. 16/749,891 filed on Jan. 22, 2020 (now U.S. Pat. No. 11,240,731), which claims priority to and benefit of U.S. Provisional Patent Application No. 62/795,518 filed on 22 Jan. 2019, and U.S. Provisional Patent Application No. 62/903,654 filed on 20 Sep. 2019. The entire content of the before-mentioned patent applications is incorporated by reference as part of the disclosure of this patent document.

TECHNICAL FIELD

This document generally relates to wireless networks, and more specifically, to optimizing operation and control of wireless networks.

BACKGROUND

Today's networks often experience severe data channel outages when operating in real-world environments. The high throughput requirements coupled with dynamic operating environments make it difficult to maintain reliable wireless network connectivity, especially when control functionality is embedded in the data channel with limited additional robustness.

SUMMARY

Methods, devices and systems that use a control channel to coordinate quality of data communications in a Software-Defined Heterogenous Mobile Ad hoc Network (SD-H-MANET) are described. In an example, physical and logical separation of the data plane (that includes a data channel) and the control plane (that includes a frequency-hopped control channel) advantageously enables high link-level robustness and unified routing with minimal communication overhead.

In an exemplary aspect, a method for wireless communication in a network is described. The method includes performing, using a control plane, network management functions over a control channel that has a first bandwidth, implements a frequency-hopping operation, and operates at in a first frequency band, and performing, using a data plane that is physically and logically decoupled from the control plane, data forwarding functions, based on a routing decision, over at least one data channel that has a second bandwidth and operates in a second frequency band different from the first frequency band.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 7A shows an example of a link-state routing (LSR) network reacting to a low-power jammer turning on.

DETAILED DESCRIPTION

Figure 1:
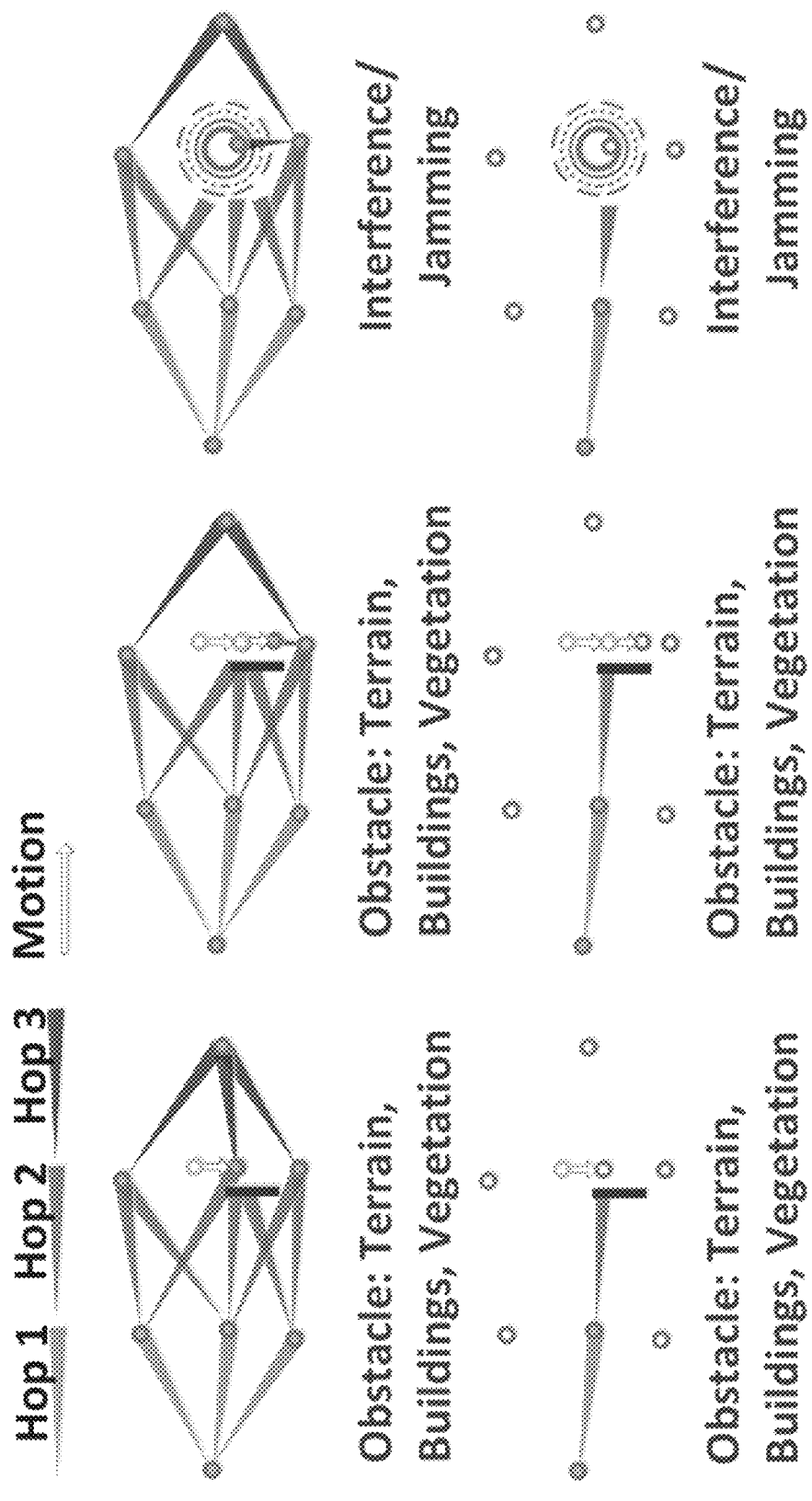
FIG. 1 shows exemplary comparisons between Barrage Relay networking (BRn) and traditional link state routing (LSR) in various adverse network scenarios.

Military communication networks are often subject to severe spectral and environmental degradations that can result in complete loss of network connectivity. In some examples, modern military communication systems support, in these adverse and challenging RF conditions, tactical field operations in areas without infrastructure.

A method that has been long considered as a promising solution to achieve the goal of infrastructure-less communication support is the deployment of Mobile Ad hoc Networks (MANETs). These are envisioned as fully decentralized systems with self-organizing capabilities, hence having the required robustness and scalability. Nevertheless, legacy MANETs function at a basic level and suffer from issues such as complex configuration requirements and protocol overhead due to network topology changes.

At the same time, Software-Defined Networking (SDN), an approach to network management that enables dynamic, programmatically efficient network configuration in order to improve network performance and monitoring, is increasing being deployed in various scenarios and contexts in a wide variety of applications.

However, SDN and MANETs are viewed as antithetical technologies that have been developed to solve different problems. SDN assumes an infrastructure that provides reliable connections between a centralized controller and the data forwarding elements it manages. In contrast, MANETs are characterized by a lack of centralized control, lack of association among nodes, rapid mobility of hosts, frequently varying network topology, shared broadcast radio channel and a limited availability of resources.

Embodiments of the disclosed technology provide Software-Defined Heterogeneous Mobile Ad hoc Networks (SD-H-MANETs), which create a highly-protected control channel to share network connectivity and global RF status, and control plane intelligence to tolerate signal degradations and enable the data plane to exploit short windows of link availability.

Section headings are used in the present document for ease of understanding and do not limit the embodiments and techniques to the corresponding sections. As such, embodiments from one section can be combined with embodiments from other sections.

1. Introduction

The present document describes SD-H-MANET embodiments that include a cognitive control plane that senses and maintains an omniscient view (OV) of the data network (which includes, for example, global (link-by-link) RF status and traffic observables, e.g. message completion rates, local queue build-ups, etc.) and organizes data network resources (links, frequencies, waveform modes, antenna patterns, etc.) to serve multiple data traffic attributes (latency, throughput, resilience, information security, etc.).

The SD-H-MANET includes a distributed control plane which eliminates the need for a centralized controller that would otherwise provide a single point-of-failure. The SD-H-MANET control plane comprises a highly-resilient control channel that can disseminate local RF sensing observables across the network rapidly and reliably, continually providing each local control plane element with the network OV. In this sense, the SD-H-MANET control channel mimics a network of dedicated wired connections as closely as possible. SD-H-MANET abstracts data plane elements are as mere forwarding devices (FDs) through standardized application programming interfaces (APIs), enabling a common control plane to serve disparate networks. SD-H-MANET control plane elements are also called a Software Defined Network Controllers, or SDNCs.

Embodiments of the disclosed technology are described in the context of a control channel using Barrage Relay networking (BRn). BRn provides network-scale diversity techniques through multiple simultaneous transmissions that are autonomously combined and relayed along multiple network hops to create diverse spatial paths. As seen in FIG. 1, this path diversity provides network level robustness to all types of link outages that cannot be matched by link-level techniques alone. BRn takes full advantage of the broadcast nature of the wireless medium, ensuring rapid and reliable data dissemination using autonomous cooperative relays.

Embodiments of the disclosed technology include a narrowband (NB) frequency-hopping (FH) control channel physical layer that operates in conjunction with BRn, providing link-level resilience (e.g. against jamming interference) and frequency flexibility in addition the network-scale resilience provided by BRn.

The present document is organized as follows: Section 2 describes the architecture of an SD-H-MANET, which includes a logical and physical separation of the data plane and the control plane, which include the data channel and the control channel, respectively. Section 2 further describes various features and aspects of an SD-H-MANET:

Section 2.2 discusses SD-H-MANET control channel optimized for low-overhead multi-hop channel access and delivery of short control messages containing status of local RF links.

Section 2.3 discusses SD-H-MANET control channel with an integrated sensing schedule using broadcast probes initiated by each node in a round robin schedule. The preferred embodiments of the envisioned control channel implement a narrowband frequency-hopping waveform that provisions for probe transmissions at the band edges of data channels, minimizing interference to and from the data channel transmissions.

Section 2.4 discusses SD-H-MANET control channel broadcast mechanisms that substantially reduce the overhead associated with control information exchange between SDNCs. For multi-hop control dissemination, the preferred embodiments of control channel implement Barrage Relay networking (BRn), which provision for RF combining of a plurality of copies of the same control message originating from different control radios.

Section 2.5 discusses how the envisioned SD-H-MANET control plane closes the gap between proactive and reactive data network management by providing on-demand and distributed decision making as a function of up-to-date data network status. In particular, the SD-H-MANET distribute CP enables support for anycast data forwarding over heterogeneous links according to software-defined policy, and without the need for global network convergence.

The control channel, which can also be used for band-edge sensing, is described in Section 3. Different contexts and various applications of an SD-H-MANET and the control channel are described in Section 4, and Section 5 incorporates the examples and embodiments described into systems, methods and devices that use a control channel to coordinate quality of data communications in an SD-H-MANET.

2. SD-H-MANET Architecture

Software-Defined Networking (SDN) technology is an approach to network management that enables dynamic, programmatically efficient network configuration in order to improve network performance and monitoring. By decoupling the control plane and data plane physically, SDN has the potential for optimized performance and enhanced reconfigurability as a general network solution. Physically decoupling means that, the control plane functionality for establishing routing/forwarding decisions is relocated to the SDN Controller(s) (SDNC), while individual network elements are relegated to be forwarding devices (FDs). Logically decoupling the control plane and data plane results in different functionalities being implemented in each of the planes, e.g., network management and data forwarding, respectively.

For wired networks, the topology is primarily static and can be planned a priori, therefore SDN can be implemented using centralized controllers managing a fixed set of data network elements. In contrast, MANETs are subject to rapid topology changes and may not be managed efficiently using a static configuration of network controllers. For military MANETs, resilient data network connectivity requires a distributed control plane approach, a plurality of SDNCs can share up-to-date status of the global network topology.

Embodiments of the disclosed SD-H-MANET control plane comprises a narrowband control channel that operates in a band-separated fashion from the data plane. The control channel performs sensing of local data channel RF status and disseminates these observables across the network to provide an omniscient view (OV) of the network. The SDNCs process the OV to manage the data communications. Since each data plane element is driven by its local SDNC independently, a data plane packet traversing through the network can be forwarded on a hop-by-hop basis using up-to-date network state information, without requiring end-to-end convergence.

Preferred embodiments of the disclosed resilient control channel implement a frequency hopping physical layer that performs active sensing of the data channels via transmission of narrowband probe sequences at data channel band edges, enabling assessment of data channel status without disrupting data communications. Frequency hopping further enables the sensing observables to be disseminated at low frequency bands (e.g. VHF) that provide propagation advantage as compared to higher frequency bands (e.g. L-band) where wideband data channels operate.

2.1 Example Components of an SD-H-MANET

Figure 2:
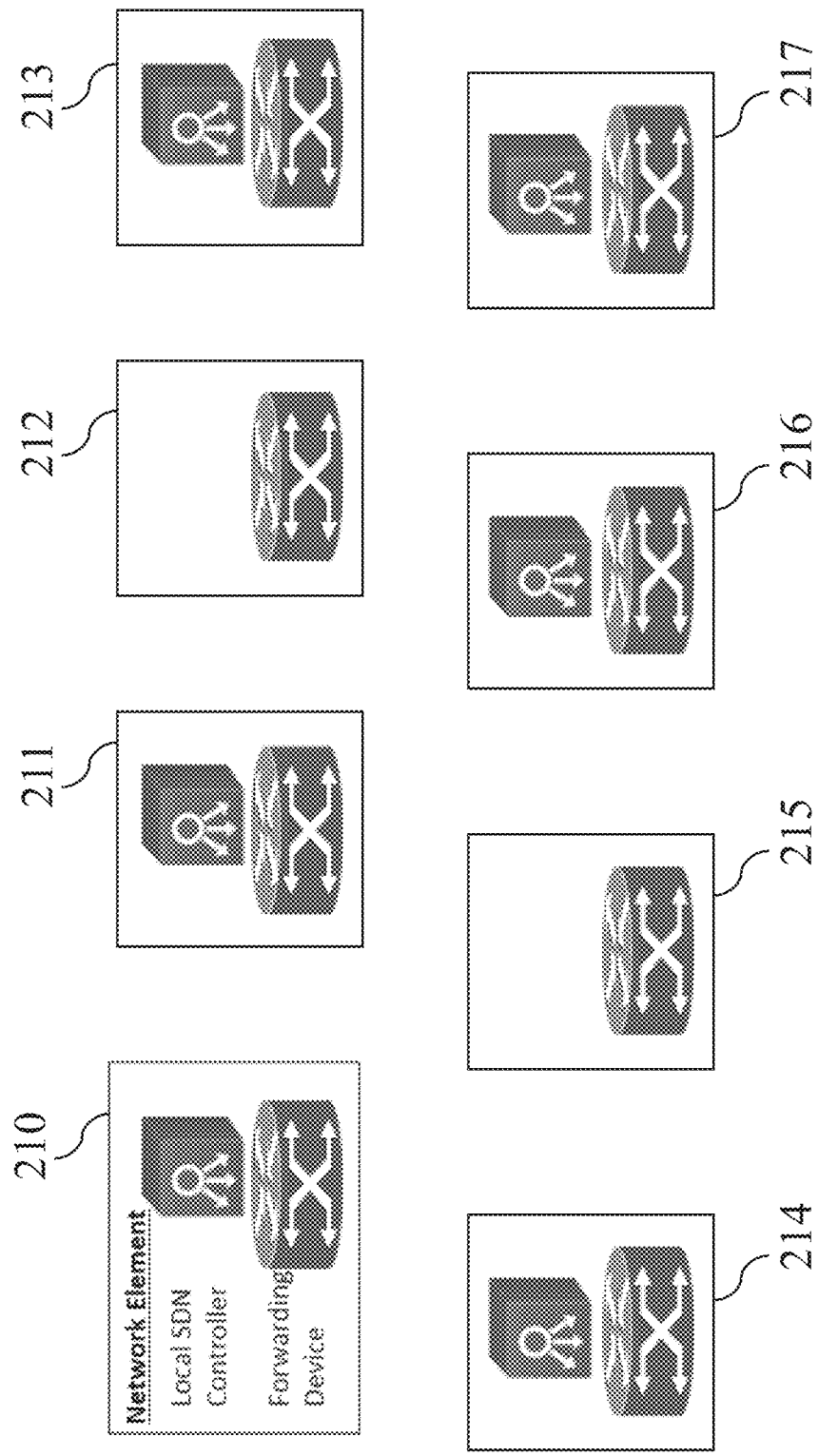
FIG. 2 shows an example of a mobile ad hoc network (MANET) with software-defined networking (SDN) network elements.

Embodiments of the disclosed technology apply SDN to heterogeneous multi-hop MANET without relying on any infrastructure wired connectivity. As shown in FIG. 2, every MANET network element will host a SDNC accessing a CP wireless interface, and a forwarding device managing one or multiple DP wireless interface(s). In other examples, a local SDNC may be hosted on only a subset of the available MANET elements (e.g., network elements 210, 211 213, 214, 216 and 217 include both the SDNC and the DP element (i.e., a data channel), whereas network elements 212 and 215 only include the FD).

In some embodiments, the wireless interface(s) of the network element incorporates, amongst other features, the following features:

The physical (PHY)/medium access control (MAC) layer of each interface may be the same or different. Selecting a broadcast-efficient waveform (e.g. Barrage Relay networking) for the CP interface will significantly reduce the CP overhead which is all broadcast in nature. Conversely, it will increase the topology update rate.

The operating spectrum band(s) and instantiated frequency channel(s) of each interface does not typically interfere with all other collocating interface(s) on the network element, which is common in multi-channel radios. Operating the CP waveform with narrower channel and carrier frequency with better propagation characteristics will improve the overall network performance. The smaller the CP network diameter, the less overhead for multi-hop information dissemination. The longer the control-plane RF range with respective to the data-plane's, the faster the CP topology dissemination covering the same DP hops potentially. The link budget differential between a 50 kHz narrowband waveform operating at UHF and a 5 MHz wideband waveform may be more than 50 dB in contested/congested RF environments.

In some embodiments, the control-plane waveform may be implemented using a spread spectrum (SS) waveform, which may also be hopped in frequency.

In some embodiments, the CP interface may also act as a DP interface if spare capacity is available. In other embodiments, the CP interface shall provide multi-hop connectivity among all network elements.

In some embodiments, the DP wireless interface(s) may be heterogeneous across the network. In other embodiments, each non-CP wireless interface(s) may provide partitioned connectivity of a subset of network elements.

In some embodiments, the CP element (e.g., the control channel) and the DP element (e.g., the data channel) can be accessed simultaneously using different channels of a multi-channel radio. In other embodiments, the CP and DP elements can be accessed at different times (e.g., different timeslots) using the same channel in a multi-channel radio.

Figure 3A:
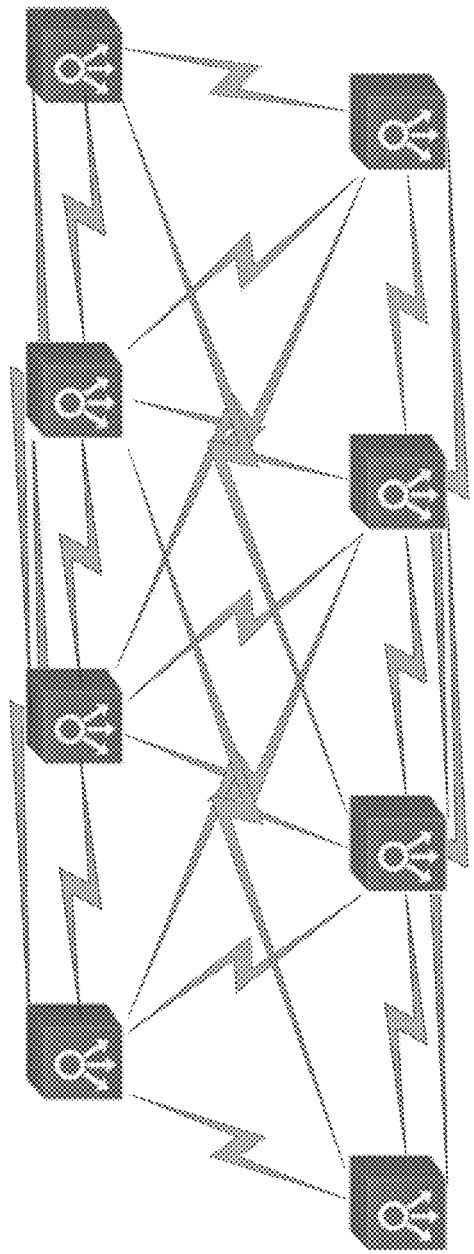
FIG. 3A shows an example of a control plane (or Control Plane (CP)) topology.
Figure 3B:
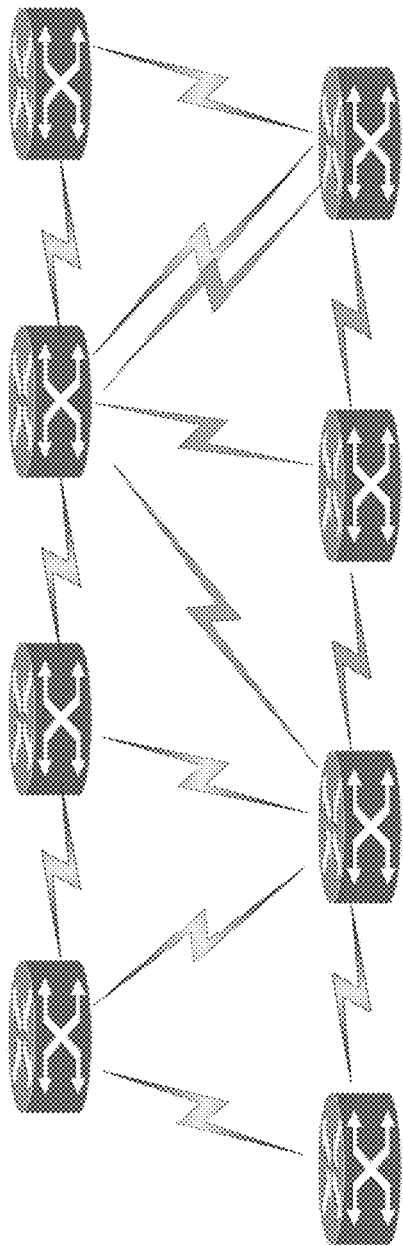
FIG. 3B shows an example of a data plane (or Data Plane (DP)) topology.

FIGS. 3A and 3B illustrate the CP and DP topologies, respectively.

Figure 4A:
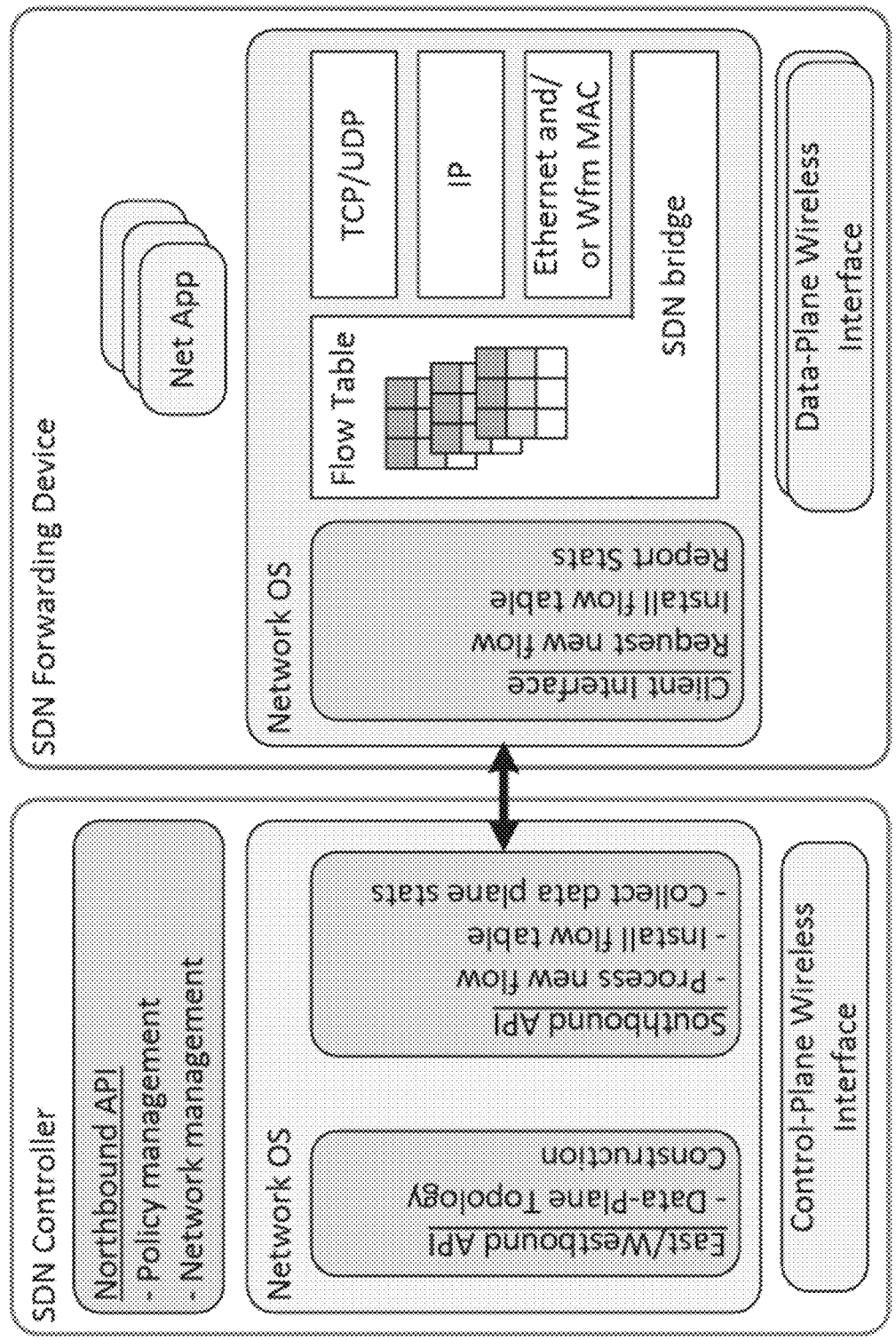
FIGS. 4A and 4B show examples of the functional architecture for an SD-H-MANET network element.

FIG. 4A illustrates an example of the functional architecture for an SD-H-MANET network element. Each local SDNC is responsible for (i) independently reconstructing the global data-plane multi-hop topolog(ies) via east/westbound interface, (ii) providing policy and network management via a northbound interface, and (iii) servicing flow requests originated from the local DP based on (i) and (ii) via a southbound interface. All over-the-air information exchanges between local SDNCs (northbound and west/eastbound) will be transmitted and received through the CP wireless interface.

The data channel is responsible for transporting DP traffic end-to-end based on the flow table installed by the local SDNC. DP waveforms may adopt different packetization mechanisms. Some waveforms may directly reuse the Ethernet headers for over-the-air identifications, creating a LAN-like operation mode. Other waveforms may encapsulate the payload with additional waveform header. Furthermore, given the broadcast nature of wireless medium, even if there is only a single DP wireless interface, it is still necessary to identify the sources of the over-the-air receptions. Consequently, the flow table forwarding rules may need to consider additional meta-data related to the waveforms, if it exists.

Figure 4B:
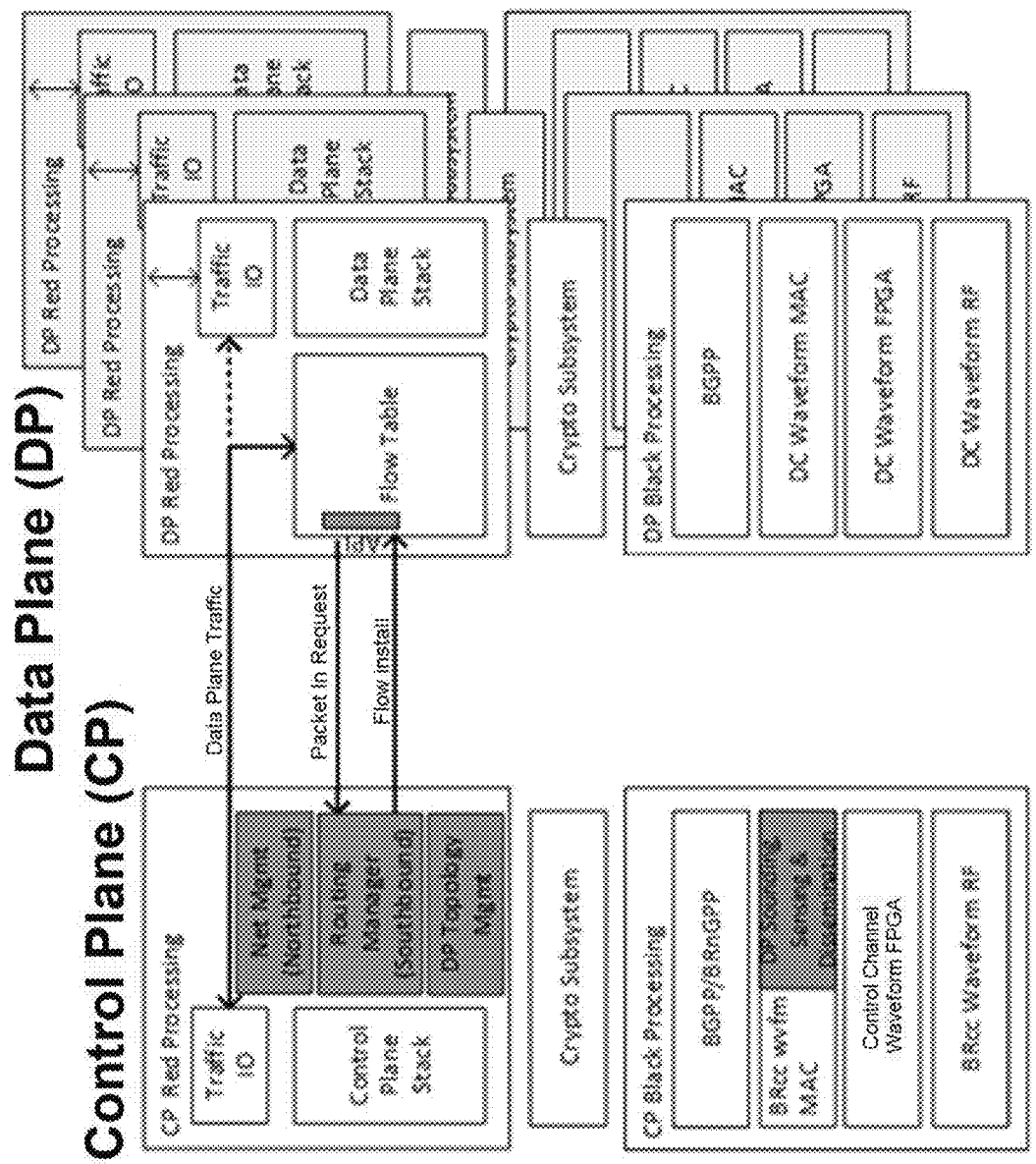

FIG. 4B illustrates another example of the functional architecture for an SD-H-MANET network element. As shown therein, both the CP and the DP include a red (or secure and compartmentalized) processing module and a black (or unsecure) processing module, which communicate via a crypto subsystem. The data plane includes red-side and black-side processing (with the intermediate crypto subsystem) for each waveform or interface. In both the DP and the CP, the black processing consists of the waveform components (which include the MAC, FPGA and RF modules or components).

The routing manager in the CP communicates via the API with the flow table in the data plane to appropriately route DP traffic between the flow table (in the data plane) and the traffic input/output (IO) module (in the control plane). As described in the present document, the CP includes a module for the sounding, sensing and dissemination of information (e.g., PLI) for the DP (further described in Section 3).

Figure 5:
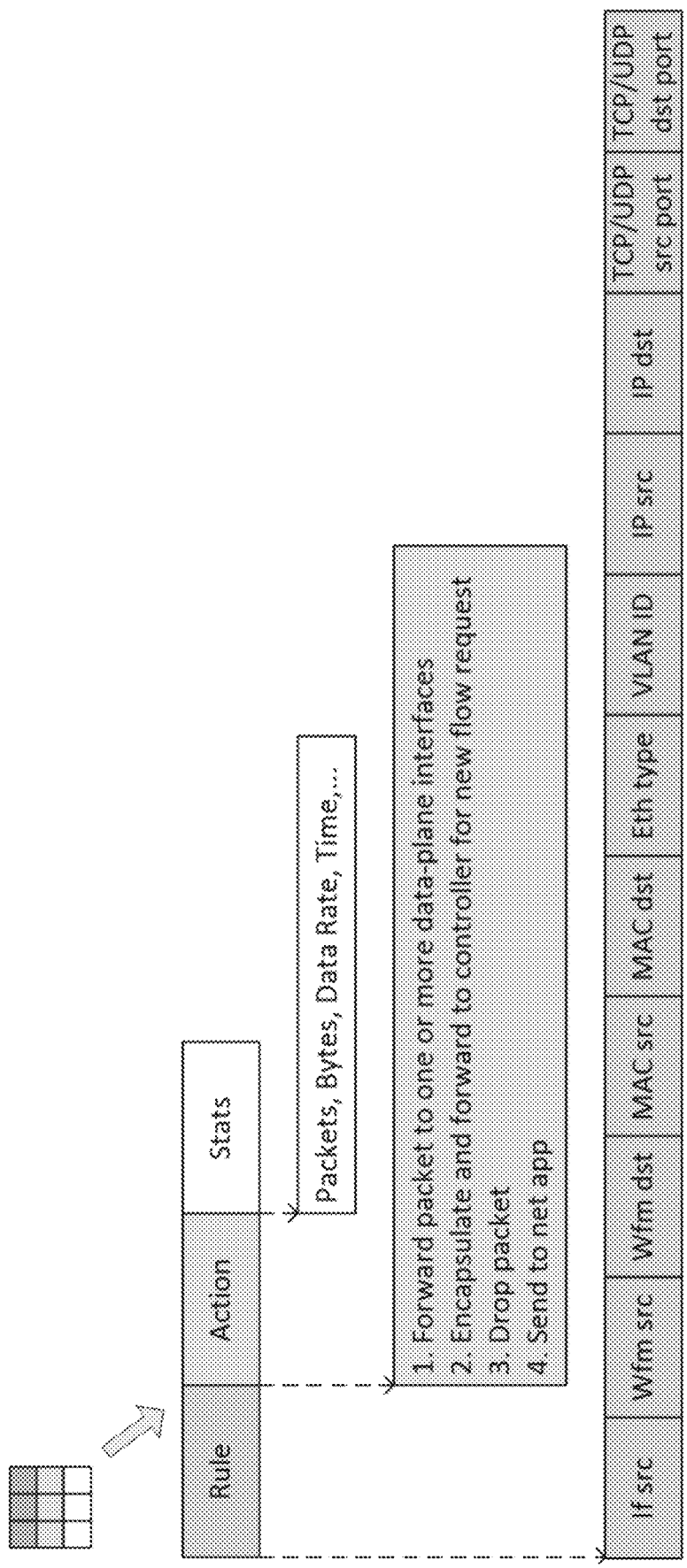
FIG. 5 shows an example of a generic set of metadata used by the control plane.
Figure 6:
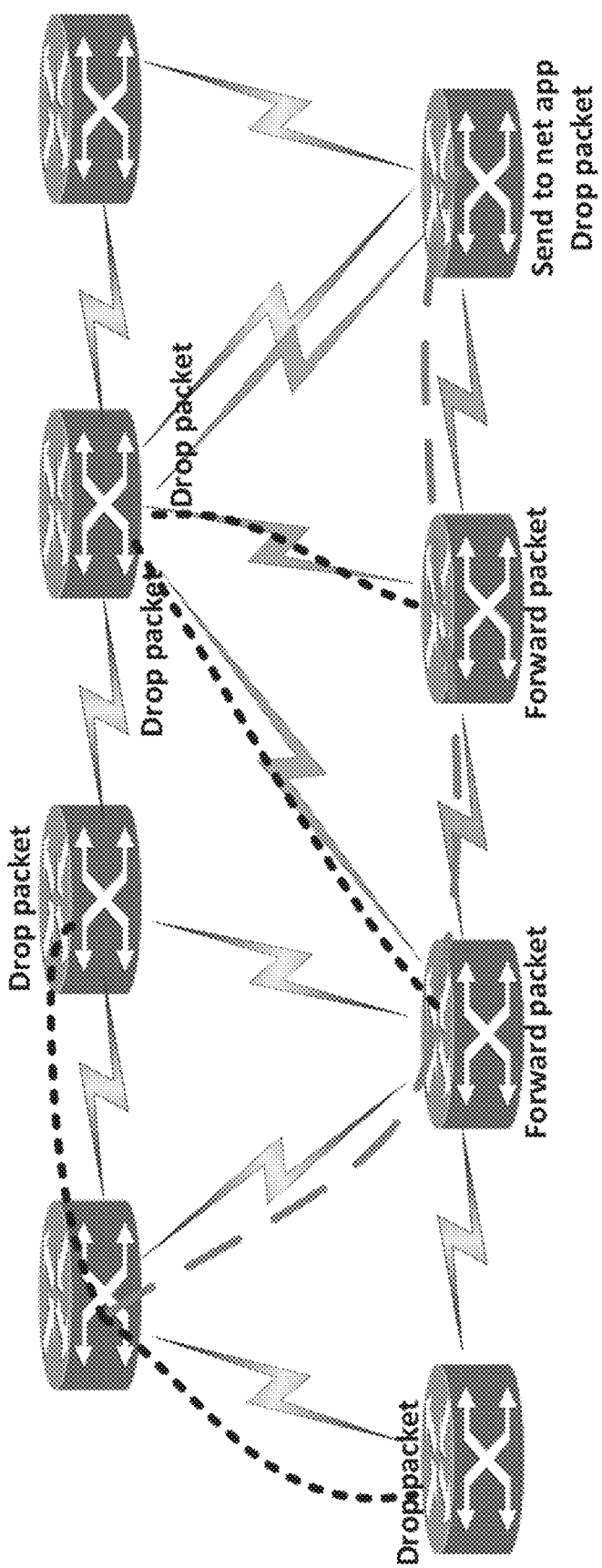
FIG. 6 shows an example of an end-to-end path status in an SD-H-MANET.

FIG. 5 lists a generic set of metadata that the CP may take into account in forwarding decision making. Using a single flow table shared among all data-plane wireless interfaces, the SD-H-MANET is able to consolidate heterogeneous radio link resources to form the status of end-to-end paths, as illustrated in FIG. 6.

In some embodiments, Barrage Relay networking relies on network-wide time synchronization, with minimal overhead for basic network maintenance, it is inherently very scalable and can support >250 nodes within a single flat network while occupying very little bandwidth (50 kHz or less). In contrast, traditional MANETs typically have trouble scaling beyond 30-40 nodes even when operating over channels with MHz of bandwidth. Some of the specific problem encountered by traditional MANETs include:

Determining and maintaining routes can overcome entire network capacity for network sizes only a few 10s of nodes under moderate network topology variation (due to node motion, interference, etc.). This factor is significantly increased for high data rate directional networking.

Distribution of conventional data voice and location are not well suited to high data rate networking. This application is often characterized by:

Traffic that is typically broadcast or multi-cast;

Voice latency constraints that require frequent channel access with the amount of data moved being very small; and Location information including a small amount of data which must be repeated continuously throughout the network.

The present document uses examples from BRn only to facilitate understanding and the disclosed techniques, and embodiments may be practiced in other networks that use different networking protocols that supports features that are similar to the BRn protocols.

Amongst other features and benefits of the described embodiments, some features of the SD-H-MANET include:

Control channel: The control channel (e.g., the Barrage Relay control channel (BRcc)) is a narrowband frequency-hopping (FH) waveform that exhibits significant RF link-level resilience with respect to wideband data channels, which is typically no less than the data channel to control channel bandwidth ratio. The control channel enjoys an additional link-level resilience (typically on the order of 25 dB) due to aperture and penetration advantage in low bands. It also provides a network-level resilience advantage on the order 50 dB due to Barrage Relay spatial diversity. As a result, the total resilience advantage of control channel with respect to legacy data channels could exceed 100 dB.

Some embodiments of the control channel described herein leverage FH to perform active-sensing at band-edges of data channels, without the need for coordination with or interference impact to data waveform. In other embodiments, the control channel can scale to 200+ nodes, disseminating position-location information (PLI) and an omniscient view of the data network flexibly over a wide range of frequency bands.

In some embodiments, the SD-H-MANET is enabled by a highly-resilient control channel that can distribute control information among the radios rapidly. The control channel needs to tolerate severe RF degradations, operating reliably even when the data channels can no longer function.

In some embodiments, the control channel is configured to operate with a bandwidth between 1 kHz and 100 kHz, and in a portion of a ultra-high frequency (UHF) band between 300 MHz and 3 GHz or a very-high frequency (VHF) band between 30 MHz and 300 MHz. In other embodiments, the operating frequency of the control channel can be configured to be between 30 MHz and 100 GHz.

Control plane (CP): The control plane includes the control channel and the control-side intelligence (also referred to as the Software-Defined Networking Controller or SDNC in the context of SD-H-MANET embodiments), which interprets the omniscient view of the network and allocates resources for data services in accordance with throughput, latency, and resilience requirements of the underlying data flows. In some embodiments, the control plane is responsible for Layer-2 and above functionality. In some embodiments, the control plane may perform network management functions (which include establishing routing decisions) over the frequency-hopping control channel.

Data channel: The data channel acts as a forwarding device (also referred to as a data forwarding device, and with Layer-1 functionality) in the SD-H-MANET embodiments. In traditional networking systems, the data channel is typically responsible for some aspects of Layer-1 through Layer-3 functionality.

In some embodiments, the data channel is configured to operate with a bandwidth between 1 MHz and 100 MHz, and in a portion of the UHF band, an L-band between 1 GHz and 2 GHz, an S-band between 2 GHz and 4 GHz or a C-band between 4 GHz and 8 GHz. In other embodiments, the operating frequency of the data channel can be configured to be between 100 MHz and 100 GHz.

In some embodiments, the data channel may be configured such that, for a fixed level of channel impairment (e.g., SNR of 10 dB) or jamming impairment (e.g., jammer with 1000 W, or a signal-to-jammer ratio (SJR) of 50 dB, or a jammer-to-noise ratio (JNR) of 30 dN), the data channel degrades to a greater extent than the control channel. For example, for a fixed SINR, the bit-error-rate (BER) of the data channel could be $10^{-1}$, whereas the BER for the control channel could be $5 \times 10^{-4}$, which results in a more robust control channel.

Data plane (DP): The data plane includes the data channel and limited in-band control information (from Layer-1) in the SD-H-MANET embodiments described in this document. In traditional networking systems, the data plane incorporated full control information regarding Layer-1 through Layer-3.

Compatibility with legacy networks: The SD-H-MANET embodiments enable a synergistic coexistence of SD-H-MANET-enabled radios with their legacy counterparts. The SD-H-MANET control plane monitors legacy radios and incorporates their capabilities, as well as advertises available SD-H-MANET capabilities to be exploited by legacy nodes.

2.2 Topology Management

In some embodiments, SDN solutions construct the network topology by performing (i) local connectivity discovery and (ii) remote topology dissemination. Traditional SDN topology management leverages the data traffic service of the underlying wireless interface. Although this approach is attractive for being waveform agnostic, it generally imposes excessive overhead due to node id tagging. For example, each remote link quality may be characterized by a few bits, while the source and destination of the link may require 12 bytes if they need to be identified by IEEE 802.3 address.

In some embodiments, the SD-H-MANET CP is implemented using a separate, dedicated wireless interface that is optimized for (i) low-overhead Layer-2 (channel) access and (ii) dissemination of short control messages containing local status of data links. A specialized time-division multiple access (TDMA) medium access control (MAC) that maximizes implicit scheduling information may eliminate the majority amount of over-the-air overhead related to node id tagging. At the system level, this in turn may reduce the required CP channel bandwidth and therefore improve the CP RF performance. As a result, every local SDNC independently constructs its global topology view proactively at a rate order of magnitudes faster than the state-of-the-art MANET solutions. Integrating the local discovery and remote dissemination into a dedicated CP waveform enables fully distributed local SDNCs collocated with a majority of data-plane FDs (e.g., in some cases, every data-plane element may have a collocated SDNC).

In the disclosed embodiments, the local topology discovery rate and the remote topology dissemination rate are technically independent, and can be configured according to the network size, the perceived volatility of the RF environment, and the data forwarding policy.

2.3 Local Connectivity Discovery

Local connectivity discovery is traditionally executed by the MAC functionality of individual data channels, i.e. using in-band discovery. This is still a reasonable option especially if the specific waveform can output such information without incurring additional overhead. However, such an approach often means that the rate of discovery is dictated by the specific waveform MAC, making it less configurable and potentially relatively slow with respect to the worst-case episodic channel volatility. Furthermore, such in-band discovery does not necessarily provide bi-directional link states between the local node and all its neighbors, because it is dependent on the medium access for transmit schedule.

Recognizing the limitation and discrepancy of in-band discovery, embodiments of the SD-H-MANET provide an additional out-of-band local discovery feature. Given the presence of a dedicated control-plane wireless interface, active 1-hop channel sounding and sensing can be introduced in the CP MAC.

In some embodiments, and following a round-robin schedule, each node participating in the SD-H-MANET broadcasts a 1-hop sounding probe using the CP radio interface, while all other nodes perform sensing in accordance with the respective received signals due to the probe transmission. The radio frequency of the sounding probe is tuned to the edge(s) of the operating radio frequency band of a probed DP wireless interface. Transmitting at the band edges ensures that the probe does not interfere with the normal operation in DP waveform being probed, yet reveal the real-time directional link condition from the probe transmitter to the local receiver experienced by the probed DP wireless interface to high degree of confidence, especially for wideband RF impairments due to shadowing and sweeping interference. The identity of the sounding transmitter can be inferred by the schedule timing. As a result, the sounding probe can be designed to be very short in time duration to minimize overhead. Without considering spatial reuse, the out-of-band local discovery overhead grows as $O(nr)$, where n is the overall heterogeneous SDN network size and r is the max number of data-plane wireless interfaces. The short duration of the probe ensures that the overhead grows with a small proportionality constant with respect to n and r. Additional scheduling optimization can be employed to further reduce the discovery overhead to $O(\Sigma_{i \in r} n_i)$, where $n_i$ is the actual number of participating radios in a specific data-plane waveform i. For example, 10+Hz local discovery for a network size of greater than 50 nodes can be achieved using a 50 kHz BRn waveform as the CP waveform and assuming a single DP interface. A 10+Hz local discovery means every node in the network is capable of sensing using at least 10 probes every second, from each of the other nodes in the network. This is generally adequate for fast forwarding decision adaptation even for highly volatile network topology.

In some embodiments, a narrowband frequency-hopping control channel allocates a fraction of its frequency hops for transmitting probes at the edges of data channel bands. In these embodiments, the band-edge probes may be implemented using a bandwidth efficient modulation format, e.g. continuous phase modulation (CPM), to minimize adjacent channel interference to and from the data channel being sensed.

2.4 Remote Topology Dissemination

In some embodiments, and in order to construct a global topology, local discovery information may need to be disseminated across the SDNCs, potentially over the multi-hop data channel. Existing solutions have been greatly constrained by this task. For solutions with a single, centralized SDNC in the network, it is relatively easier to formulate a signaling protocol so that all nodes maintain a path to the SDNC. For example, a hop count gradient toward to the SDNC can be built and maintained with periodic 1-hop exchanges among all the nodes. All participating nodes unicast local discovery to the controller along the gradient path. However, the single SDNC present various weaknesses in multi-hop MANET, mainly related to the fragility of data network wireless communications. Hierarchical SDNC approaches generally shorten the dissemination communication paths by installing secondary SDNCs at other nodes strategically. Nonetheless, fundamental weaknesses of centralized SDNC placement render traditional SDN approaches unfit for military MANET deployment.

Another limitation of traditional SDN approaches is the overhead associated with finding communication paths between SDNCs. The discovery of such paths incurs additional overhead, e.g. through gradient building.

The SD-H-MANET embodiment provisions local SDNCs leveraging the broadcast nature of the wireless medium to substantially reduce the overhead associated with control information flowing. In particular, letting all nodes broadcast their local discovery eliminates the SDNC path finding overhead and only incurs communication overhead that grows linearly with to the number of nodes. With a 3-bit quantization link quality characterization, the local discovery overhead is (3n) bits per second per node per hop per dissemination Hz. Combining these system design choices with a broadcast-efficient waveform MAC, peer-to-peer global topology dissemination can be done with reasonably low overhead. For example, for 1 Hz remote topology dissemination, the overall dissemination overhead among 50-node network is merely around 8 kbps per hop in the control-plane waveform, which makes it feasible to be accommodated by a dedicated 50 kHz BRn waveform. A 1 Hz global topology update is much faster than what a state-of-the-art MANET routing can achieve even in a smaller network (~8 nodes), let alone a 50-node network.

In some embodiments, the aforementioned broadcast of control information is accomplished with using a control channel based on Barrage Relay networking, where a plurality of intermediate control channel radios relay a common control message concurrently, and the resultant transmissions are combined at other control channel receivers, providing diversity gains critical for resilient control dissemination.

2.5 Forwarding Decision Engine

SDN solutions are often classified by the operational models related to the flow table installation, namely reactive and proactive. With the SDNC located remotely from the FDs, there is a performance trade between SDNC-FD interface processing delay and communication overhead. However, with local SDNC collocated with every FD, such difference between reactive and proactive modes is negligible.

Some embodiments of an SD-H-MANET have, amongst others, the following desirable attributes:

Support for heterogeneous links: The wireless interface capability knowledge, such as channel carrier frequency and waveform data rate specification, typically are static and can be acquired at configuration time, or via additional capabilities advertisement at low rate. The SD-H-MANET CP can support data path adaptation and optimization that is aware of the link heterogeneity.

Distributed Omniscient View: Facilitated by the high-rate topology updates using a dedicated control channel interface, each local SDNC is constantly and frequently supplemented with local and remote link connectivity information of the data-plane. As a result, each local SDNC can independently construct a global connectivity graph and track its historical trend, which makes the globally optimized real-time forwarding decisions feasible. Furthermore, the highly-resilient CP ensures that SDNC connectivity is maintained even if the DP connectivity is impacted. This enables the DP connectivity to be reestablished with minimal latency and communication overhead.

No requirement for route convergence: Since each FD in the network is driven by its local SDNC independently, a DP packet traversing through the network is forwarded hop-by-hop with up-to-date decisions at the time. The convergence of end-to-end paths among FDs is not necessary. More interestingly, even if a viable end-to-end DP path does not exist towards the destination, a local SDNC may opportunistically forward the packet to intermediate node(s) closer to the destination by consulting the CP topology. By doing so, the SDNC essentially realizes the opportunistic routing approach that is viable for highly volatile multi-hop MANET where traditional MANET routing breaks.

Policy adaptation flexibility: A highly specialized and dedicated CP wireless interface is capable of providing global topology knowledge at least one order of magnitude faster than the capability of a typical MANET routing protocol of the same network size. Supplemented with such a rich set of topology information and high time resolution, the local SDNC may be configured to adopt various policies as needed.

Multicast support: Currently, there is no dominant multicast protocol for SDN. A large variety of multicast solutions have been proposed to leverage the global view available at the centralized SDNC. Many of the proposed SDN multicast protocols rely on the centralized SDNC as the natural candidate for the multicast rendezvous point, for core-based-tree (CBT) protocols similar to Protocol Independent Multicast-Sparse-Mode (PIM-SM) in non-SDN networks. Under the framework of the SD-H-MANET, a similar paradigm in designing the multicast protocol may be adopted, e.g., leveraging the dedicated CP wireless interface for specialized Layer-2 assisting multicast group information dissemination. The resulting global multicast group knowledge at every local SDNC enables the capability of constructing source-based tree (SBT) on-the-fly from any multicast source. SBT generally incurs lower traffic overhead and overall transport latency than CBT.

3. Barrage Relay Control Channel (BRcc)

In some embodiments, the SD-H-MANET CP is enabled by a Barrage Relay control channel (BRcc), a frequency-hopping (FH) waveform that is able to operate over a wide range of frequency bands, exploiting the RF aperture and penetration advantage in low bands, such as VHF & UHF. Built on Barrage Relay autonomous cooperative communications capability, BRcc exploits all available spatial paths with millisecond responsiveness and provides up to 50 dB of additional network-level resilience against RF degradations, regardless of their source or sophistication.

Leveraging its FH PHY layer, the BRcc can be configured to perform active-sensing at band-edges of data channels at multiple times per second, without the need for coordination with or interference impact to data waveform. This sensing enables advantageously enables an out-of-band local discovery feature that is based on the presence of the dedicated CP wireless interface. In an example, active 1-hop channel sounding and sensing can be introduced in the CP waveform MAC.

In some embodiments, the CP may support a diameter that is greater than 1 hop, in which case the BRcc may disseminates the local sensing information using the efficient Barrage Relay (BR) protocol. The combination of local sensing and remote dissemination, when applicable, using BR, is called Barrage Relay sensing.

In some embodiments, BRcc uses only one of the channels in a multi-channel radio architecture, and advantageously minimizes the impact of network outages and facilitates rapid data channel recovery. Some advantages and benefits of embodiments of the disclosed technology include:

Frequency Hopping (FH), robust modulation, and low-band propagation advantage combines to provide 70+dB link level anti-jamming (AJ) advantage as compared to traditional data channels.

BRcc autonomous collaborative communications provides up to 50 dB of additional network level resilience, combating macro-scale RF degradations (interference, shadowing, excess path-loss) that cannot be addressed with PHY-level (collocated) MIMO alone.

BRcc controlled flooding and spatial path diversity eliminates overhead associated with Layer-3 routing protocols, leading to scalability >250 nodes in a single flat network.

BRcc actively senses data-band quality, collecting RF metrics including bi-directional link quality for all data channel links.

BRcc uses efficient dissemination protocols to maintain complete picture of data network link availability at all nodes.

BRcc can determine (in both active sensing and passing sensing frameworks) a number of channel characteristics that enable the overall operating environment to be ascertained. In an example, these channel characteristics may include a signal-to-noise ratio (SNR), a signal-to-interference-plus-noise ratio (SINR), an angle-of-arrival (AoA), a reference signal received power (RSRP) metric, and the like.

Embodiments of the disclosed technology include a synergistic combination of high data rate route-based (or hop-limited flooding) networking (directional or non-directional) along with a Barrage Relay (BR) component that develops routes for the high data rate networking and can support distribution of voice, location, and command and control (C2) messaging. High data rate networking, especially directional networking, is well suited to moving large amounts of data via spatially separated routes, but (i) not well suited to moving small amounts of Location/C2 messaging (C2 includes formatted command and control as well as text messaging and remote collaboration) multi-hop to all nodes in network (broadcast/multi-cast nature of location/C2 messaging), and (ii) not well suited to maintaining those routes for networks with dynamic topology due to motion or interference.

Thus, BR improves control channel robustness by using multiple simultaneous transmissions that are autonomously combined and relayed along multiple network hops to create diverse spatial paths. The waveform also uses power efficient modulation, modern FEC, and FH to provide a robust physical layer that can exploit the favorable RF propagation characteristics of lower frequency bands (VHF and above). In an example, and under particularly harsh ground multipath conditions (wherein a standard data channel (SDC) may lose additional 10's of dB) or highly dynamic network conditions (e.g., a network gateway on a vehicle moving in an urban area), the network-level diversity benefit becomes even more pronounced in comparison to the link-level benefits and the performance advantage of BRcc can exceed 133 dB.

Figure 7B:
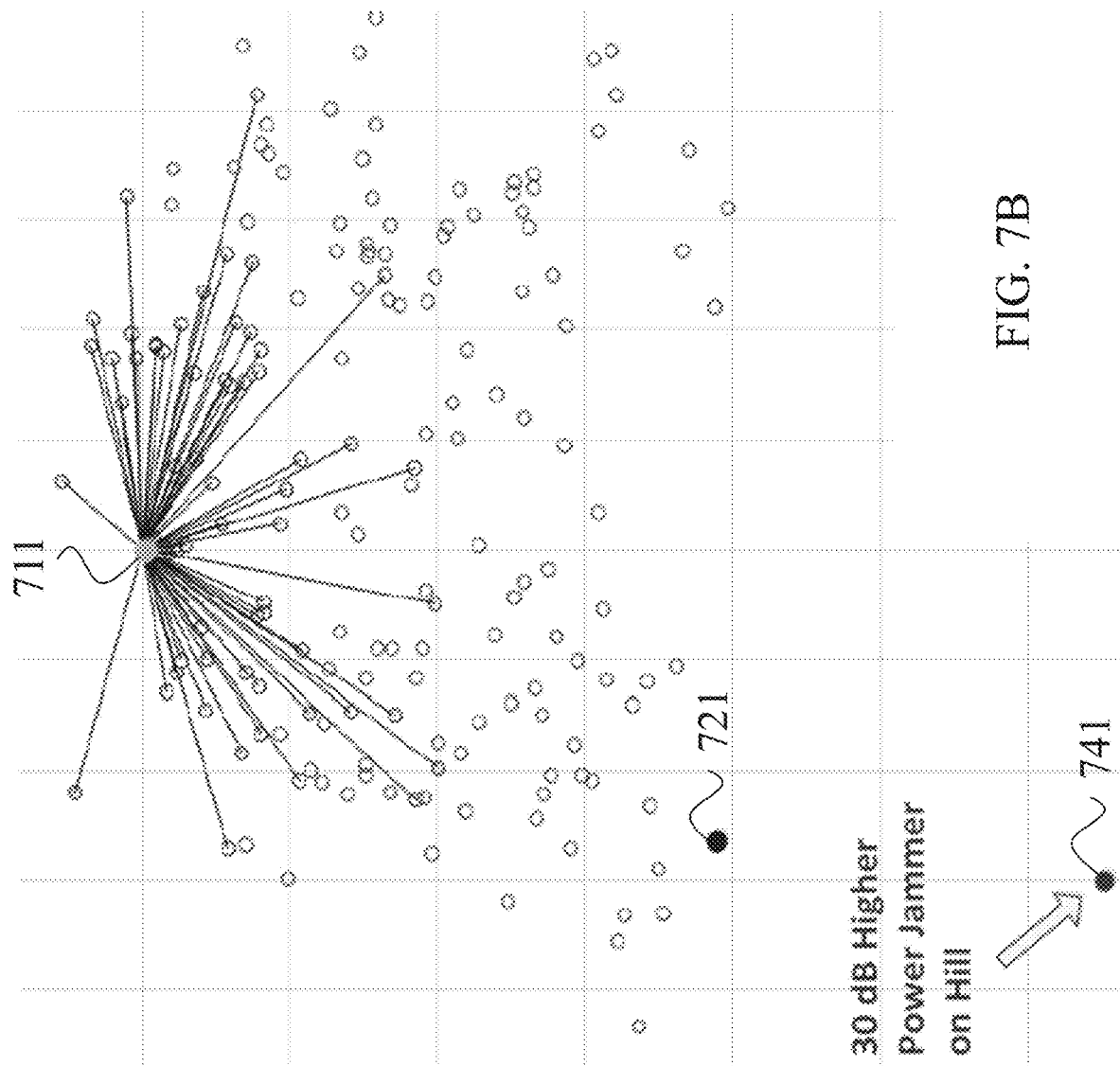
FIG. 7B introduces a high-power jammer in the example of FIG. 7A.
Figure 7C:
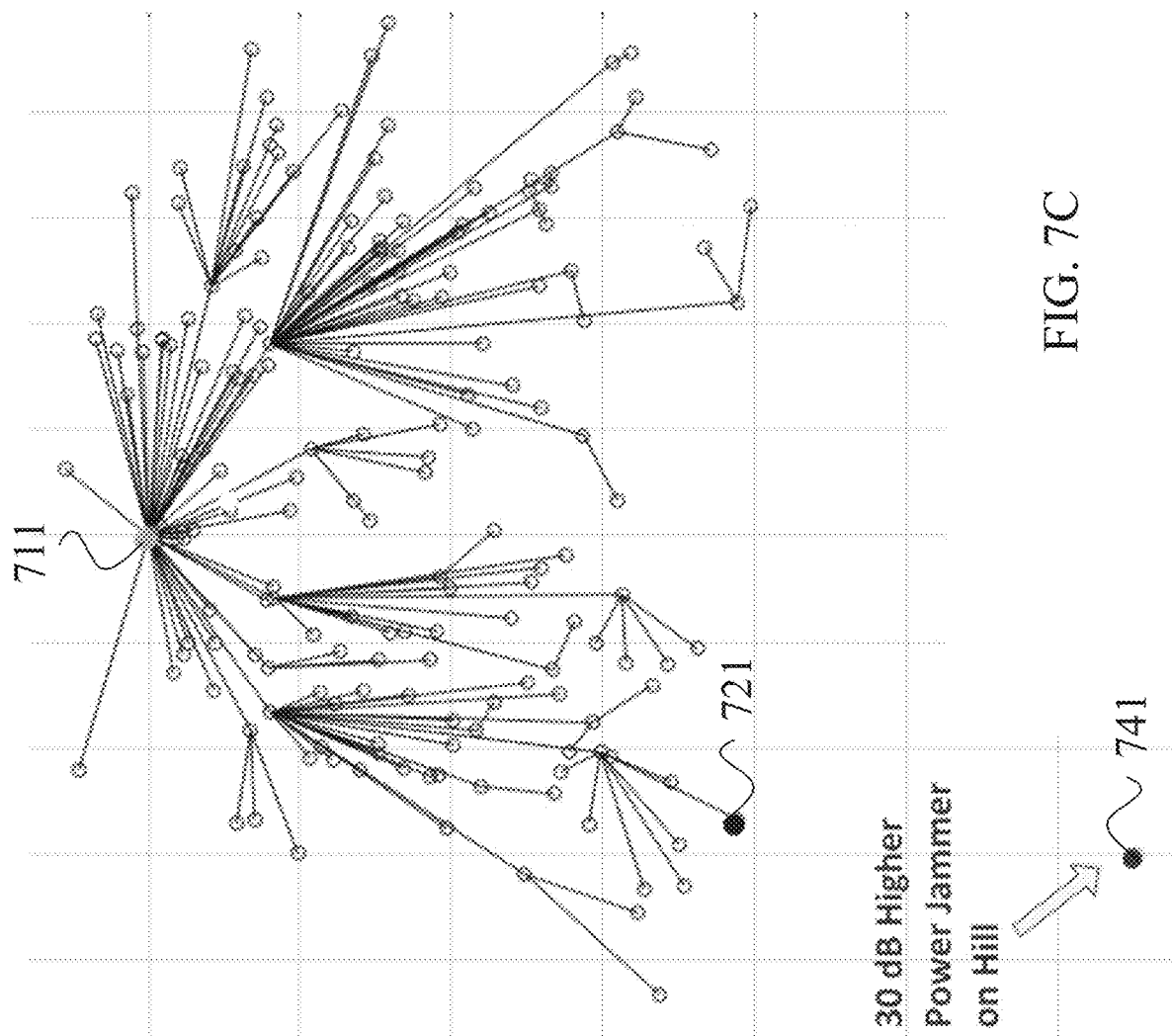
FIG. 7C shows an example of a Barrage Relay network reacting to a high-power jammer turning on, thereby demonstrating the network-level anti-jam robustness of BRn.

Robustness of BRcc. FIGS. 7A-7C shows examples of network-level anti-jam robustness advantage of BRn over traditional link state routing (LSR) approaches. In these figures, the LSR approaches are given BRcc link-level (i.e. PHY) performance to allow for a fair comparison. The simulation setup includes 180 nodes made up of a mix of 5 W (handheld) and 20 W (vehicular) radios with antennae at two meter elevation. The radios are operating at VHF and the propagation assumes the COST Hata model with VHF extension and free-space extension for the portion of the path above 200 m. In addition, lognormal shadowing is included as a first order approximation of terrain/building shadowing (based on empirical field studies). A jammer of variable power is placed at an advantaged elevation of 200 m.

The first scenario (FIG. 7A) depicts an LSR network response to a low power jammer turning on. In this case, the favorable propagation characteristics of VHF enable the headquarters node (711) to still see 94% of the nodes in a single hop, but not the node (721) closest to the low power jammer (731). In the second scenario (FIG. 7B), a high power jammer (741) turns on (30 dB higher than the low power jammer, exceeds 1000 Watts), and the headquarters node (711) see 36% of the nodes in a single hop, but none of the nodes on the forward edge (closest to the high power jammer (741)). LSR algorithms need time to adapt and optimize new routes and until new routes are found network connectivity is severely impacted. A sophisticated jammer can intentionally vary power (or location), and thus force LSR based algorithms into a never-ending transient state of trying to find new routes. In other words, as witnessed in legacy wideband tactical networks, network connectivity in jamming environments may never be robust.

In contrast, FIG. 7C shows that BRcc is not vulnerable to the higher power jammer (exceeding 1000 W and 30 dB above the jammer that impacted edge nodes employing LSR). Indeed, the multiple spatial paths of BRcc ensure that it provides maximum protection against any type of jammer variability (including mobility) by removing the need to re-compute optimal routes. Note that since BRcc maintains greater network coverage than LSR even when BRcc is exposed to a 30 dB higher jammer power, thereby demonstrating that BRcc provides at least 30 dB of AJ gain over LSR networks, even without frequency band separation.

Figure 8A:
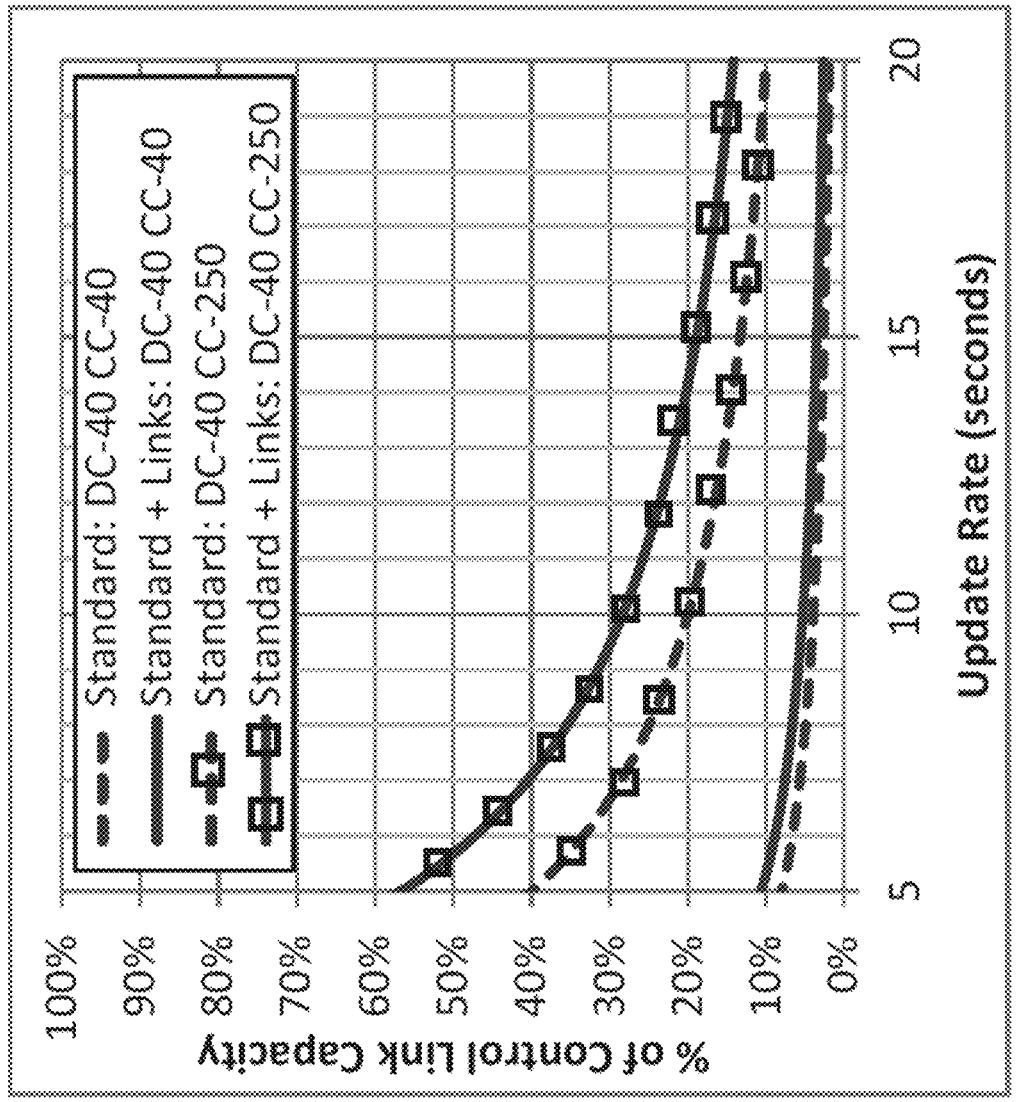
FIG. 8A is a plot showing an example of the additional control link capacity required to efficiently disseminate bi-directional data channel link information.

Scalability of BRcc In some embodiments, the BRcc can scale to at least 250 nodes in a single flat network because it is designed with very low overhead protocols for network control (including time synchronization) as well as efficient dissemination of network-wide metrics between all nodes. FIG. 8A shows the additional portion of the control link capacity required to exchange "Standard" network information: comprehensive node lists, PLI, time synchronization, and basic node association information (such as which data channel fragment each node is currently operating in) between all nodes in the network. FIG. 8A also shows the added impact of efficiently disseminating bi-directional data channel link information ("Standard+Links") derived from active data channel sensing. The remaining control link capacity is available for other CP traffic, effectively enabling PACE (primary, alternate, contingency, emergency) failover communications mechanisms.

Figure 8B:
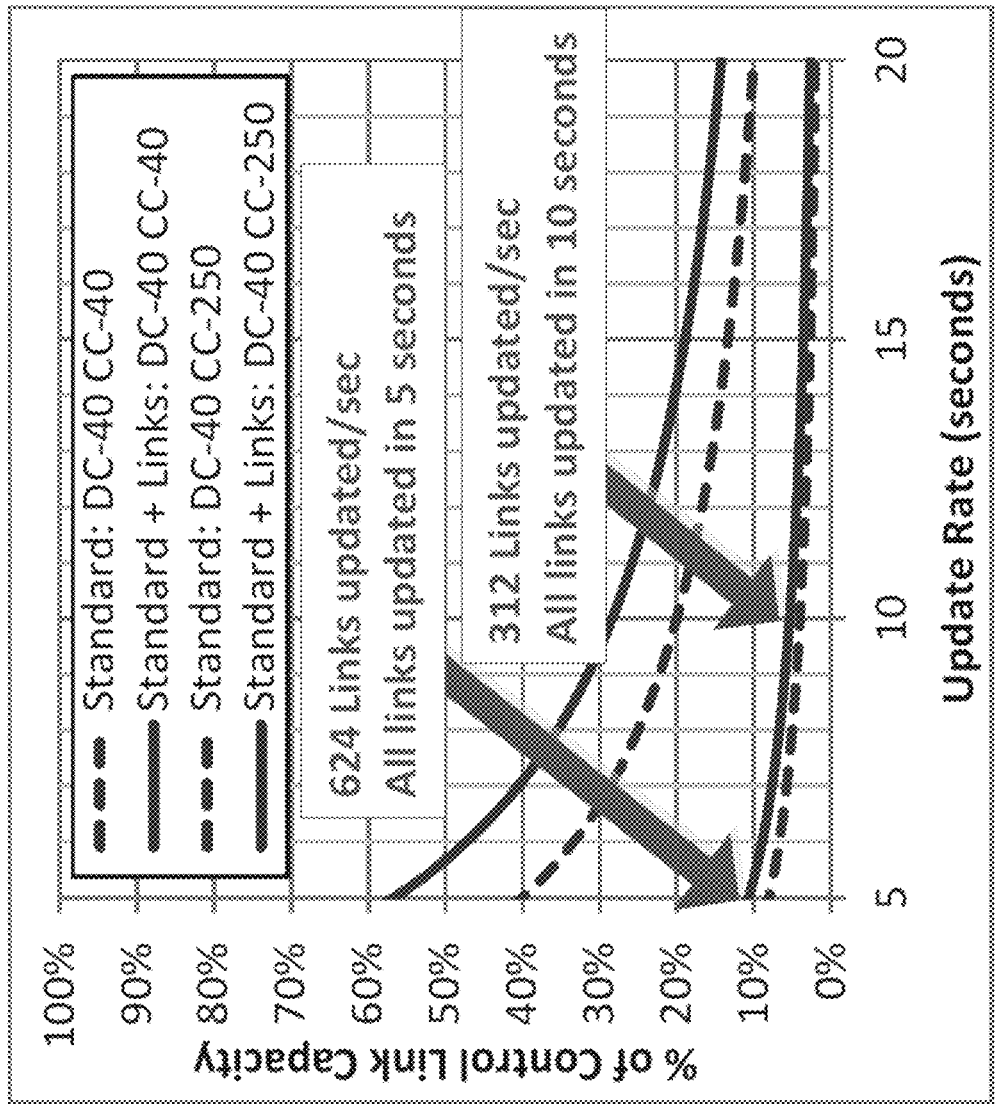
FIG. 8B shows that the additional control channel data rate used to disseminate measured link quality is directly proportional to the desired update rate in FIG. 8A.

Data channel link quality dissemination capabilities of BRcc. In some embodiments, the additional control channel capacity used to disseminate measured link quality is directly proportional to the desired update rate (difference between "Standard+"Links" and "Standard" in FIG. 8B). For a 40 node network, there are 3120 possible bi-directional links (2 directions×40 nodes×39 nodes). Traditional data channel networks generally require link stability on the order of minutes, so a 5 second update rate is a reasonable value to consider. To update the entire network picture within 5 seconds, one fifth (624) of the 3120 links must be updated each second. Note that the overhead for link reporting shown in FIG. 8B is for the highest level of compression, namely 1 bit. At this level of compression, the bi-directional link reporting will be limited to reporting good or other (average, fair, poor, no) with respect to data channel required SNR. The "Link" overhead in the figure will scale directly with increasing the number of bits utilized to report bi-directional link quality. For example, 2 bit compression allows for excellent, good, medium, or other, again compressed relative to the data channel required SNR, but will use twice the control link capacity.

Integrated data channel RF sensing capability of BRcc. Operation of the control channel in a different (lower) frequency band than the data channel provides many advantages, including favorable propagation characteristics. However, a complete separation of the control channel RF bands from those of the data channel bands (e.g. VHF vs L-band) typically means that network connectivity measurements obtained on the control channel are not predictive of data network connectivity. While long term average statistics may show correlation between propagation and interference conditions between separated data channel and control channel bands, there may be little to no correlation in any specific engagement.

Figures 9A, 9B, 9C:
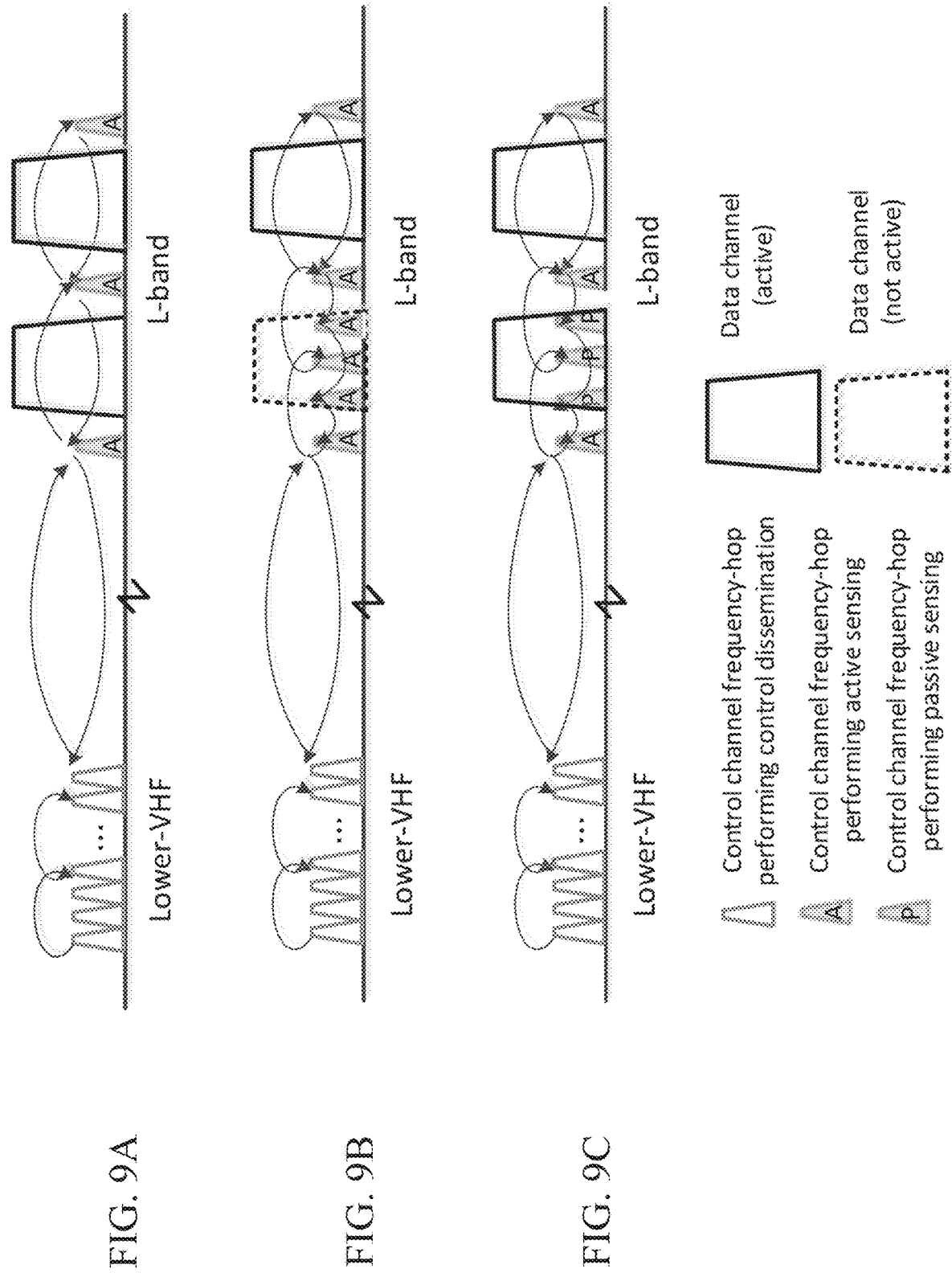
FIG. 9A shows an example of actively probing band-edges of a data channel.
FIG. 9B shows an example of actively probing a data channel.
FIG. 9C shows an example of passive in-band sensing and active band-edge probing.

In some embodiments, the BRcc provides probing capability near the edges of the active data channel (typically 1 to 20 MHz wide) to provide active data channel sensing, as shown in FIG. 9A. Large-scale signal degradations, such as excess path loss due to terrain blockage and environment, and even targeted jamming, are predictable from the band-edges. The narrowband FH PHY layers of the BRcc are suited to the task of probing near/in the data channel, as its narrowband frequency hopping design will minimize any unintentional interference associated with probing near the data channel.

In some embodiments, an estimate for the absolute data channel link quality measurement error is 8 dB, and is composed of the following: 3 dB variation between the probe (control channel) transmitter and data channel transmitter absolute power, 2 dB probe receive measurement error, and 3 dB relative antenna gain variation. Absolute noise measurement accuracy will also be within a few dB and noise measurement accuracy relative to the signal measurement will be within less than 1 dB, resulting in a total SNR error estimate of approximately 4 dB. The SNR and power estimates from band-edge measurements may be further processed, e.g. using a digital filter, to produce reliable data channel fidelity metrics.

In some embodiments, the sensing capability is also efficient, allowing for many link estimates to be measured at once. All nodes within the one hop control channel range of the transmitting node (and therefore well within the one hop data channel range) listen. For example, in a 180 node network, up to 179 RF channels can be measured during each probe transmit event. The BR sensing of data channels allows for two additional capabilities to be added. First, direct sensing of the data channel through passive digitization to observe the noise and interference environment is possible once the data channel properties are known. Second, it is possible to directly probe data channel frequencies in a coordinated fashion or during severe outage conditions.

FIG. 9A shows an example of actively probing the data channel, where a plurality of probes are transmitted at frequency-hops near the data bands, while the data channel is being used as intended. Due to the narrowband nature of the control channel frequency hops, the control channel and the data channel do not interfere with one another. The dissemination of control information (including link quality metrics obtained from the received probes) takes place in a low band with favorable propagation characteristics.

FIG. 9B shows another example of actively probing the data channel, where a plurality of probes is transmitted in band when the data network is not active. In some embodiments of the disclosed technology, the control plane manages data plane medium access and traffic scheduling and therefore can schedule in-band probing and data transmissions in a time-interleaved fashion.

FIG. 9C shows an example of passive in-band sensing and active band-edge probing. When data networking resumes, only data-channel band-edges are monitored by changing the control-channel frequency hopping patterns. This sensing function is performed with zero overhead on the BRcc through local spatial reuse (discussed in the context of FIG. 8 and described later). Passive sensing observables from active data channel epochs and passive data channel epochs may be combined to generate link quality metrics for the data channel. In an example, the link quality metrics that are generated could include SNR, SINR, AoA or RSRP.

In another example, the probes may use different antenna elements from those being used for the high-rate data communication. In yet another example, the probing and data communication may be performed simultaneously by implementing interference mitigation to lessen the impact of the probing signal in the frequency band associated with the high-rate data communication.

Figure 10:
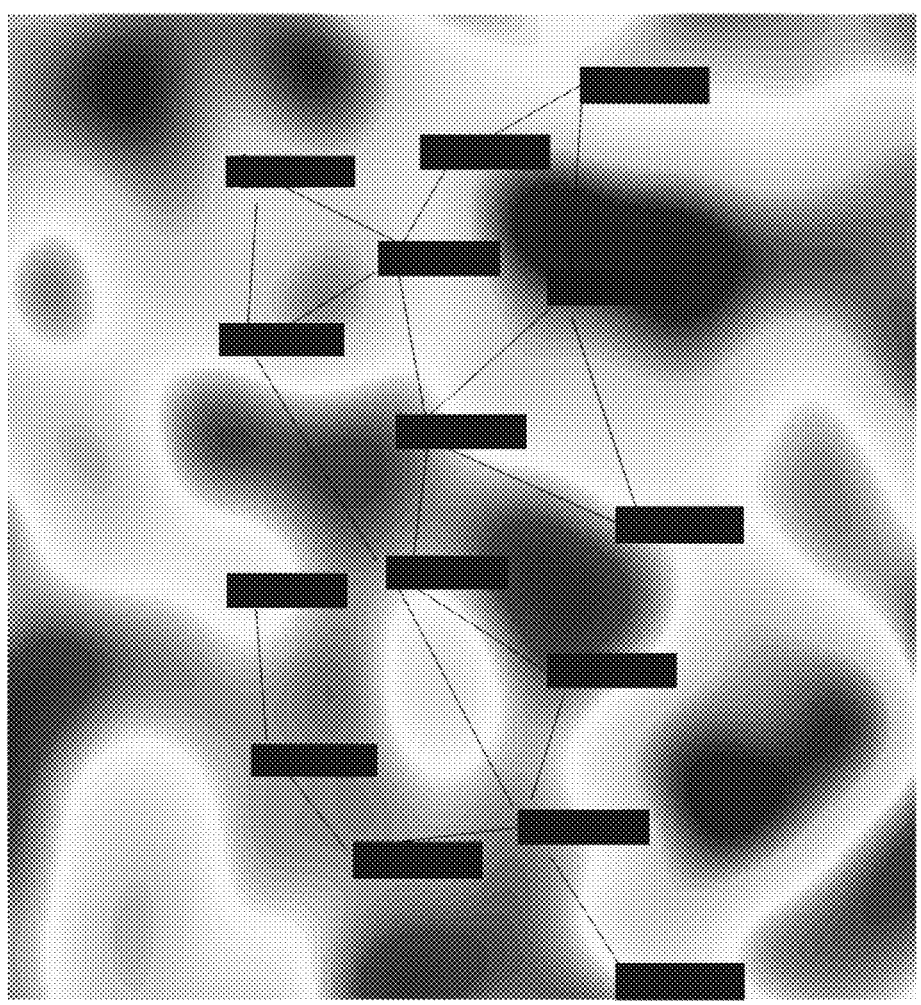
FIG. 10 shows an exemplary heat map of an radio frequency (RF) environment.

FIG. 10 shows an exemplary heat map (or state) of an RF environment in space-time that can be generated using the BRcc, where node motion enables the probing of different locations in the operational space. Compression of the sensing observables enables accuracy, responsiveness and scale, and in some embodiments, the BRcc provides the necessary state information for compression. In an example, the spatio-temporal redundancy can be learned and exploited since the RF link quality is predictable (or at least smoothly varying) along a space-time grid.

Figure 11:
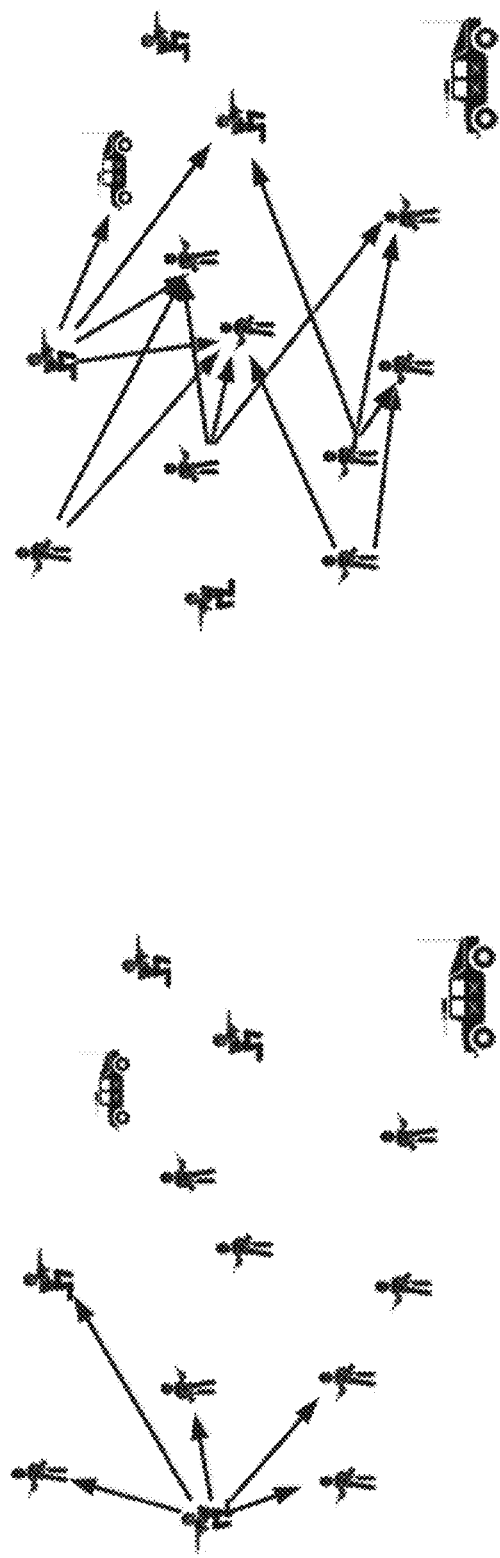
FIG. 11 shows an example of active sensing being performed in the data channel band while control information is being distributed to all nodes in the control channel network.
Figure 11:
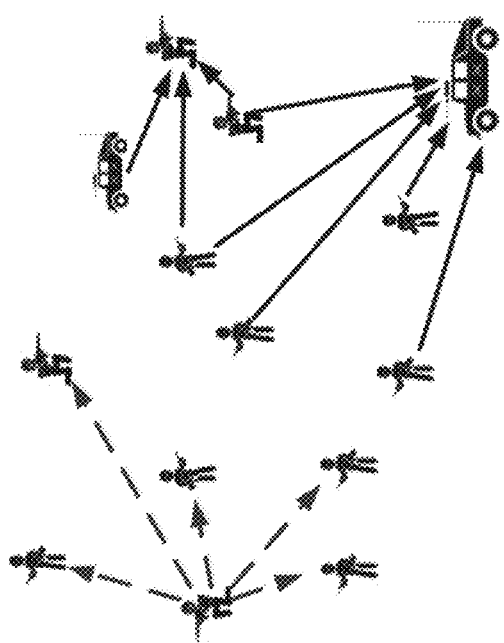

Data channel availability via active and passing sensing using BRcc. Embodiments of the disclosed technology can implement active sensing near the data channel band edges and passive sensing inside the data channel band. The CP band separation enables active local sensing be built in the spatial pipeline without significant overhead impact. FIG. 11 shows an example of active sensing being performed near data channel bands while the position while control information being distributed to all nodes in a separate band.

In some embodiments, the frequency hopping probe signals in the control channel may be uniformly distributed across a frequency band. After the sensing results have been collected, the distribution of the frequency hopping probe signals may be biased based on the results. In an example, fewer probe signals may be transmit in frequency bands where sustained interference is sensed. In another example, additional probe signals may be transmitted in frequency bands that are less used to ascertain what portion of the RF spectrum is being lightly utilized or subject to minimal interference and/or jamming.

In some embodiments, BRcc may be used to serve as an umpire for a variety of heterogenous networks. That is, the active and passive sensing capabilities of the control channel may be used across different cellular networks, WLANs, etc. This can advantageously ensure that the optimal (e.g., from a bandwidth utilization point of view) portions of the RF spectrum are being used for high-rate data transfers. For example, since cellular networks used predefined portions of the RF spectrum, their band edges could be probed to determine whether the RF interference environment is particularly disruptive, and an alternate predefined portion of the RF spectrum could be suggested for use.

In some embodiments, the sensing and probing functionality of the BRcc could be used to estimate the propagation characteristics of the higher-bandwidth data link, and more generally, serve as an RF spectrum analyzer that is inherently resilient to interference and jamming due to the use of narrowband FH.

4. Example Applications of SD-H-MANET and BRcc

The abstraction of diverse data planes as forwarding elements and the scalability of the control channel (e.g., BRcc) make SD-H-MANET suited for coordination of heterogeneous battlefield assets. The omniscient view of the network provided by the SD-H-MANET can also be used for Directional Networking (DN), enabling a high-throughput mobile backbone that consists of physically advantaged nodes with directional transmission capability. In addition, joint frequency adaptive networking (or dynamic spectrum access (DSA)), in which the control plane and data plane are jointly adapted in frequency, ensures a highly survivable control plane with the capability to transmit critical C2 data, as well as a resilient data plane. DSA facilitates coexistence with indigenous signals, ensuring adaptability to diverse RF environments.

The control channel (as described in Section 3) can be used in conjunction with the SD-H-MANET architecture (as described in Section 2) to provide a wide variety of applications that meet the requirements of current and emerging networks. Certain aspects of the control channel, control-side intelligence and data channel functionality and features are enumerated for some applications. These applications include, but are not limited to, the following:

4.1 Packet Routing

Control Channel: In some embodiments, the control channel is responsible for (i) sensing the quality of individual links, and (ii) disseminating the sensing information across the network.

Local sensing: Can either be passive or active.
(a) Active sensing: Each control radio is scheduled to transmit known narrowband probes (together with a radio id) adjacent to the data channel band at regular intervals. The probes are heard by 1-hop neighbor control radios, which measure a received signal-to-interference-plus-noise ratio (SINR). The SINR values are processed (e.g. filtered, quantized etc) to produce a link-quality metric.

(b) Passive sensing: Each control radio is scheduled to tune to the data channel band and collect I/Q samples. The I/Q samples are input to a data signal preamble detector and channel estimator. If a preamble is detected, an SINR measurement is made and recorded. The SINR values are processed (e.g. filtered, quantized etc.) to produce a link-quality metric.

In some embodiments, the link-quality metrics may further comprise data network feedback observables such as transfer completion rates, ACK/NACKs, and data service latency (per-hop or end-to-end).

Remote dissemination: Each radio is scheduled to transmit a broadcast message that contains link id (from radio-j to radio-i) and the associated link-quality metric, LQM (j→i), and a hop counter. The hop counter is incremented as this message gets relayed beyond the first network hop. As a result of dissemination, each node is provided with a global view of the quality of each link in the network ($N^2$-N of them). Note that any given time, nodes will in general have a slightly different view, due to different propagation times of quality metrics toward different nodes.

SDNC: With a global view of the RF+ topology (defined as the collection of LQMs for each link), the SDNC of a given source node can chart an optimized data route towards a destination node, e.g. using a shortest path criterion. This routing information may be communicated to other radios using control channel messages. Alternatively, the routing information could be communicated to the data radio to be included as part of the data packet. RF topology is link-by-link SINR, RF+ topology is RF topology plus link-by-link latency and/or error rate.

Data Plane: The data plane forwards packets in accordance with the next hop recipient information.

A narrowband, RF separated control channel operating in the lower frequency bands (e.g. VHF, UHF) than the wideband data channels (L-band, S-band, etc.) will enjoy significant resilience due to (i) propagation advantage (really aperture advantage), and (ii) reduced noise+interference density integration. This is referred to as the standard advantage in the remainder of the document. The resilience advantage translates to stable network convergence, especially in dynamic RF environments, which would overwhelm traditional in-band routing maintenance.

4.2 Directional Data Networking

Control Channel: The control channel is responsible for (i) sensing the quality and directionality of individual links, and (ii) disseminating the sensing information across the network. The wireless interface of the control channel may comprise an omnidirectional antenna and a directional (sectorized or phased array) RF aperture, or a sectorized antenna that can be operated in an omnidirectional fashion.

Local sensing: Each control radio is scheduled to transmit a known probe (together with a radio-id) omnidirectionally at regular intervals. The probes are heard by the by 1-hop neighbor control radios, which determine a received signal-to-interference-plus-noise ratio (SINR) for each resolved receive direction. For each direction the SINR is processed (filtered, quantized etc.) to produce a link quality metric. The pair (direction, link-quality metric) is referred to as a directional link-quality metric.

Remote dissemination: Each radio is scheduled to transmit a broadcast message that contains link id (from radio-j to radio-i), at least the directional link-quality metric that has the highest SINR value, and a hop counter. The hop counter is incremented as this message gets relayed beyond the first network hop. As a result of dissemination, each node is provided with a global view of the directional quality of each link in the network ($N^2$-N of them). Note that any given time, nodes will in general have a slightly different view, due to different propagation times of quality metrics toward different nodes.

SDNC: With a global view of the directional RF topology, the SDNC of a given source node can chart a directional data route towards a destination node, e.g. using a shortest path criterion. A source node can also compute multiple, non-interfering routes for different traffic flows. This routing information may be communicated to other radios using control channel messages. Alternatively, the routing information could be communicated to the data radio to be included as part of the data packet.

Data Plane: Per the instructions of the CP, the DP configures a directional transmission pattern: For sectional antennas the DP can be instructed to map one or more of traffic flows to different directional elements. For phased-arrays, a transmission pattern may be configured to have a plurality of distinct directions, and a single traffic flow can be mapped to all configured directions.

Provides the standard advantage. The resilience advantage of the control channel facilitates the forming of a dynamic backbone network, connecting several subnetworks (in the case of TSM) or different networks. The resilience advantage of the control channel motivates a reduction its power footprint, e.g. by frequency spreading, enhancing the overall LPD attributes of the system.

4.3 Network Resource Controller (NRC) Election

Control Channel: Performed as described in Packet Routing in Section 4.1.

SDNC: The effectiveness of many Layer-2 and Layer-3 functionalities in a multi-hop ad hoc network is impacted by the network topology. A node at the center of mass of the network tends to be a better (more stable) candidate for performing centralized functions that are vulnerable to single point of failure. Such functions include, but are not limited to, the furnishing of the reference network time reference and coordinating the network MAC schedule. With a global view of the RF topology, a given node is equipped with intelligence to independently rank the effectiveness of nodes in the network with respect to such functionalities. For example, the ranking metric can be in various forms of graph centrality, such as degree centrality, closeness centrality, in-betweenness centrality, or Laplacian centrality. It is common to devise a dynamic election algorithm based on the rank metric, in which time holdoff and/or other mechanisms are adopted to differentiate ability of an individual node to perform the aforementioned centralized functions. A node elected to perform these functions is referred to as the Network Resource Controller (NRC) in this document.

Data Plane: The Data Plane is instructed with the election/devolution of the data network resource controller.

4.4 Frequency Management

Control Channel: The control channel is responsible for (i) sensing the background noise+interference level for a plurality of candidate data network frequencies and (ii) disseminating this information across the network.

Local sensing: In one example, control radios are scheduled to tune their RF front-end to each one of {1760 MHz, 1780 MHz, 1800 MHz, 1820 MHz, 1840 MHz} and take digital or analog power measurements for 20

MHz notional data communication bandwidth. In another example, a control radio may tune to 1800 MHz, digitize the 100 MHz-wide band [1750 MHz, 1850 MHz], and take digital power measurements for each center frequency. Per the disclosed SDNC concept, control radios are assumed to know which bands are being actively used by the data channel, and when, thereby can take make background power measurements free of the data signal. The power measurements are converted (by filtering, quantization, etc.) to a vector of frequency fidelity metrics by each radio.

Remote dissemination: Each radio is scheduled to transmit a broadcast message that contains vector frequency fidelity metrics and a hop counter. The hop counter is incremented as this message gets relayed beyond the first network hop. As a result of dissemination, each node is provided with a global view of the RF background noise+interference fidelity as experienced by each node in the network. Note that any given time, nodes will in general have a slightly different view, due to different propagation times of fidelity metrics toward different nodes.

SDNC: With a global view of the frequency fidelity across the network, the NRC may instruct a network-wide frequency switch. The network resource controller may also schedule different traffic flows to different frequencies.

Data Plane: The data plane receives a frequency switch command and configures the data channel physical layers to tune to the instructed center frequency.

Provides standard advantage. For dynamic spectrum access applications, separating the control channel frequency is key to the stability of the system, as the dissemination of the information re: the degradations on the data frequencies is decoupled from the degradations themselves.

4.5 Network Slicing

Control Channel: The band-separated control channel rapidly assesses and makes available globally the perceived quality of network resources $Q_N(link,freq)$ comprising SINR, IN, volatility, and/or latency. Herein, SINR is an estimated signal-to-interference-plus-noise ratio as measured by S→D transmission on the link, IN is an interference plus noise power as measured at the D end of the link, latency is a time comprises a queueing delay and transmission delay at S, propagation delay from S to D, and queueing and processing delay at D.

SDNC: The plurality of data channel radios, frequencies and waveform modes is interpreted as network resources available to be used by a data service originating from a source node. A data service is characterized by a set of attributes $Q_D(service)$ comprising peak data-rate, burstiness (sparse or streaming), tolerable latency, tolerable error-rate, information security and intended destination. Example data services are voice, PLI, text/chat, streaming high data rate IP traffic (e.g. video), bursty IP data traffic (e.g. C2). The CP SDNC performs a dynamic assignment of $\{Q_N(link,freq)\}$ to $\{Q_D(service)\}$— in this fashion, the network is divided into logical service channels, or slices.

Data Plane: The plane forwards traffic in accordance with the network resource organization performed by the control plane, transmitting messages on specified radios, with indicated waveform modes over selected frequencies.

4.6 Failover Communications Over Multiple Heterogeneous Transports

Control Channel: A common control plane manages traffic across multiple data transports. Data transports may be virtual, i.e. be different waveform modes pertaining to a common transport.

Local Sensing: The control channel is responsible for collecting the state of locally available data transports, including advertised transport attributes (bandwidth/data rate, min-latency, information security level, gateway connectivity, local queue build-up) as well as feedback observables (message completion rates, remote queue build-up etc.).

Remote Dissemination: The common control channel disseminates transport feasibility metrics, produced by the SDNC.

SDNC: The SDNC is responsible for converting transport status to transport feasibility metrics for a given data service. Transport feasibility metrics are adapted as a function of feedback observables, even when transport attributes remain unchanged. The network manager, as the global NRC, ingests the transport feasibility metrics and decides whether to switch data transport for a particular data service.

Data Plane: Per the instructions of the SDNC, data services switch to the intended transport interfaces (data channels).

Provides standard advantage as well as common operating picture, enabling automated network management.

4.7 Timing Synchronization

Control Channel: The control channel is responsible for (i) performing a network/time acquisition function at MAC layer, and (ii) providing high-precision network time reference (e.g. PPS signal) to the data channel via hardware interconnect.

Network/time acquisition: Many wireless networking technologies, especially those based on TDMA, have Layer-2 control functionality for network/time acquisition, which allows radios to search and join an existing network, and/or form a new network. Relying on periodic Layer-2 beacon messages, nodes in the same network are able to establish passively a common time reference with reasonable accuracy, and optionally adopt time-tracking to align continually the local clock and the network time reference. The network/time acquisition typically requires some amount of channel access time and is generally considered as Layer-2 management overhead.

Output high-precision time reference signal: Typical modern software-defined radio platforms consist of devices (e.g. FPGA) that are capable of real-time processing at sub micro-second or better level of temporal resolution. In typical embodiment, the network time reference is managed by such a device, outputs the time reference externally via a hardware interconnect at a pre-defined rate, e.g. 1 pulse per second (PPS) signal, while the associated high-precision time value is stored in memory-mapped register/buffer in the shared memory.

The receiving entity of the hardware PPS interrupt signal may retrieve the time value accordingly.

SDNC: As part of the normal Layer-2 functionality, the CP provides high precision network time reference for the co-located data channel radio.

Data Plane: The data channel radio may leverage the high-precision network time reference supplied by the control channel radio. It may result in data channel Layer-2 overhead reduction and potentially lower access latency.

Provides the standard advantage. A stable network time reference can be continuously maintained in presence of data channel connectivity outage. The network acquisition and associated overhead and access latency can be eliminated from the data channel services.

4.8 Rate Adaptation

Control Channel: Performed as described in Packet Routing in Section 4.1.

SDNC: With a global view of the RF topology, the SDNC of a given node is equipped with the instantaneous bi-directional link quality information of all links pertained to itself. In addition, it can apply simple filters to generate moving average and/or near-future prediction based on the continuous sequence of instantaneous samples. Both instantaneous and processed link quality information can be used to dynamically select the proper data channel transmission mode to optimize the channel data throughput.

Data Plane: The data plane network performance metrics, such as throughput and latency, can be optimized with the control side intelligence.

Provides the standard advantage. The global knowledge of the RF topology facilitates unicast/multicast multi-hop rate adaptation, especially in conjunction with packet routing.

4.9 Power Control

Control Channel: Performed as described in Packet Routing in Section 4.1.

SDNC: With a global view of the RF topology, the SDNC of a given node can construct a weighted link graph of the data channel network, with each individual link weight characterizing the link's LQM. Based on the weighted link graph, the node can apply graph theory metrics to intelligently evaluate the impact on its degree of connectivity to the data channel network under various hypothetical transmission powers. Multiple such metrics are available in the literatures. One example is the Laplacian centrality, which contends that the importance (centrality) of a vertex is related to the ability of the network to respond to the deactivation of the vertex from the network.

The node may increase its transmission power on the data channel if an existing low connectivity condition can be improved. On the other hand, it may decrease its transmission power on the data channel to reduce power consumption and/or RF detectability if the connectivity condition can be maintained at a satisfactory level.

Data Plane: The data plane network performance metrics, such as message completion rate and power consumption, can be optimized with the control side intelligence.

Provides the standard advantage.

4.10 Optimal Data Channel Access

Control Channel: Performed as described in Packet Routing in Section 4.1.

SDNC: With a global view of the RF topology, the SDNC of a given node can construct a detailed bi-directional graph of the data channel network, with the knowledge of the link margin based on LQMs. For a multi-hop ad hoc network with a centralized TDMA scheduler, it is feasible to allocate a plurality of parallel transmissions between link pairs after evaluating the interference conditions among all transmitters. If the LQM of the link between a transmitter and its intended receiver has adequate margin over the LQMs of the potential interfering link(s) between other simultaneous transmitter(s) and the intended receiver, the intended transmission can succeed—known as the capture effect. As a result, the highly desirable spatial reuse can be maximized in an intelligent fashion.

Data Plane: The data channel radio's network-wide aggregated channel capacity can be maximized under arbitrary traffic topology.

Provides the standard advantage.

4.11 Joint Frequency Adaptive Networking

In some embodiments, the Data Channel (DC) and the Control Channel (CC, and also referred to as the Barrage-Relay control channel, or BRcc) are jointly adapted in frequency and coordinated by the NRC. This application is also referred to as dynamic spectrum access (DSA). This application is characterized by:
- a data plane with access to multiple frequency channels (within a band), and
- a BRcc-enabled control plane with access to multiple frequency bands (e.g.

UHF, VHF, L-band, Sband) and multiple frequencies (narrowband hops) within a band through a set of frequency hopping patterns.

For example, the operating band is UHF (225-450 MHz) with channels [229 231] (230), [325 375] (350), etc., which could be a data network channel band or a control network channel hopping band. Frequency-hopping could be implemented: BRcc ~50/100 kHz instantaneous bandwidth (IBW).

In some embodiments, the control plane (through BRcc local sensing and remote dissemination, as before):
- (i) monitors the fidelity of a plurality of frequencies within a prevalent control band through active and passive sensing, and computes a plurality of fidelity scores, one for each frequency (hop) in that band, for the control channel frequency-hop being able to operate robustly in that frequency, computes a plurality of fidelity scores, one for each available hopping-pattern, for the control channel frequency-hopping pattern being able to operate robustly, based on the per-frequency scores. computes an aggregate fidelity score for the control channel being able to operate in the prevalent control band, based on the per-frequency scores.
- (ii) monitors the fidelity of the DC band through active and passive sensing at the data channel band edges, computes a plurality of fidelity scores, one for each frequency in that band, for the data channel being able to operate robustly in that particular frequency.
- (iii) monitors the fidelity of at least one candidate channel (other than the DC band and the prevalent control channel band), through passive sensing only, computes a plurality of fidelity scores, one for each frequency (hop) in that band, for the control channel frequency-hop being able to operate robustly in that frequency, computes a plurality of fidelity scores, one for each available hopping-pattern, for the control channel frequency hopping-pattern being able to deliver robust performance in that channel, based on the per-frequency scores, computes an aggregate fidelity score for the control channel being able to operate in the control band, based on the per-frequency scores.
- (iv) instructs the control network (via the resource controller) for band and channel selection and the data network (through each radio) for channel selection, wherein the control network band and channel selection is based on the aggregate scores from (i) and (iii), and the data network channel selection is based on the aggregate scores from (ii),
- (v) instructs the control network (via the resource controller) to avoid a plurality of frequency-hopping patterns, by a remapping (on-the-fly) to the other frequency-hopping patterns.
- (vi) instructs the control network (through each radio) to offload narrowband traffic (voice, telemetry, etc.) on the basis of the scores (i-iii), making available its excess capacity (beyond its own maintenance and sensing traffic) to the data network. This is the failover or PACE element.
- (vii) adjusts sensing rates of (i-iii) based on perceived environment and failover data traffic needs.

5. Embodiments of the Disclosed Technology

As discussed previously, embodiments of SD-H-MANET provide, amongst others, the following capabilities to satisfy current and emerging network requirements:

Control plane resilience: The link-level resilience of the SD-H-MANET control channel is predicated on (i) a narrow instantaneous bandwidth (IBW), limiting the exposure of control channel links to RF interference, and (ii) frequency agility, enabling control channels to exploit the aperture and penetration advantage of low-bands while having sensing capability of high-band data channels. The two advantages combine to provide 45+dB link-level resilience to the frequency-hopping control channel, which maintains a narrow instantaneous bandwidth (IBW) of 50 kHz. In contrast, wideband approaches to control channels design, e.g. re-purposing legacy data channels as control channels and spread-spectrum techniques, will operate with little or no resilience advantage.

Control plane scalability: Embodiments of the SD-H-MANET are able to scale to the size of the data networks without requiring gateways or creating spectrum management issues for network planners. Based on the efficiency of Barrage Relay networking, the control channel can scale up to 200+ nodes in a single channel, whereas traditional (non-BRn) control network connectivity requires 50×-100× more bandwidth to be aggregated for the same scale, limiting network scalability to few tens of nodes, even in relatively benign RF conditions. The scalability of the control plane is perhaps more important for heterogeneous networking applications of the battlespace, where airborne and terrestrial networks may be jointly deployed.

Heterogeneous Data Plane Support: The SD-H-MANET embodiments improve the performance of disparate data plane waveforms by providing additional spatial and/or temporal redundancy at the network level.

The examples and embodiments described above may be incorporated in the context of the methods described below, e.g., methods 1200 and 1300, which may be implemented, for example, in the apparatus shown in FIG. 14.

Figure 12:
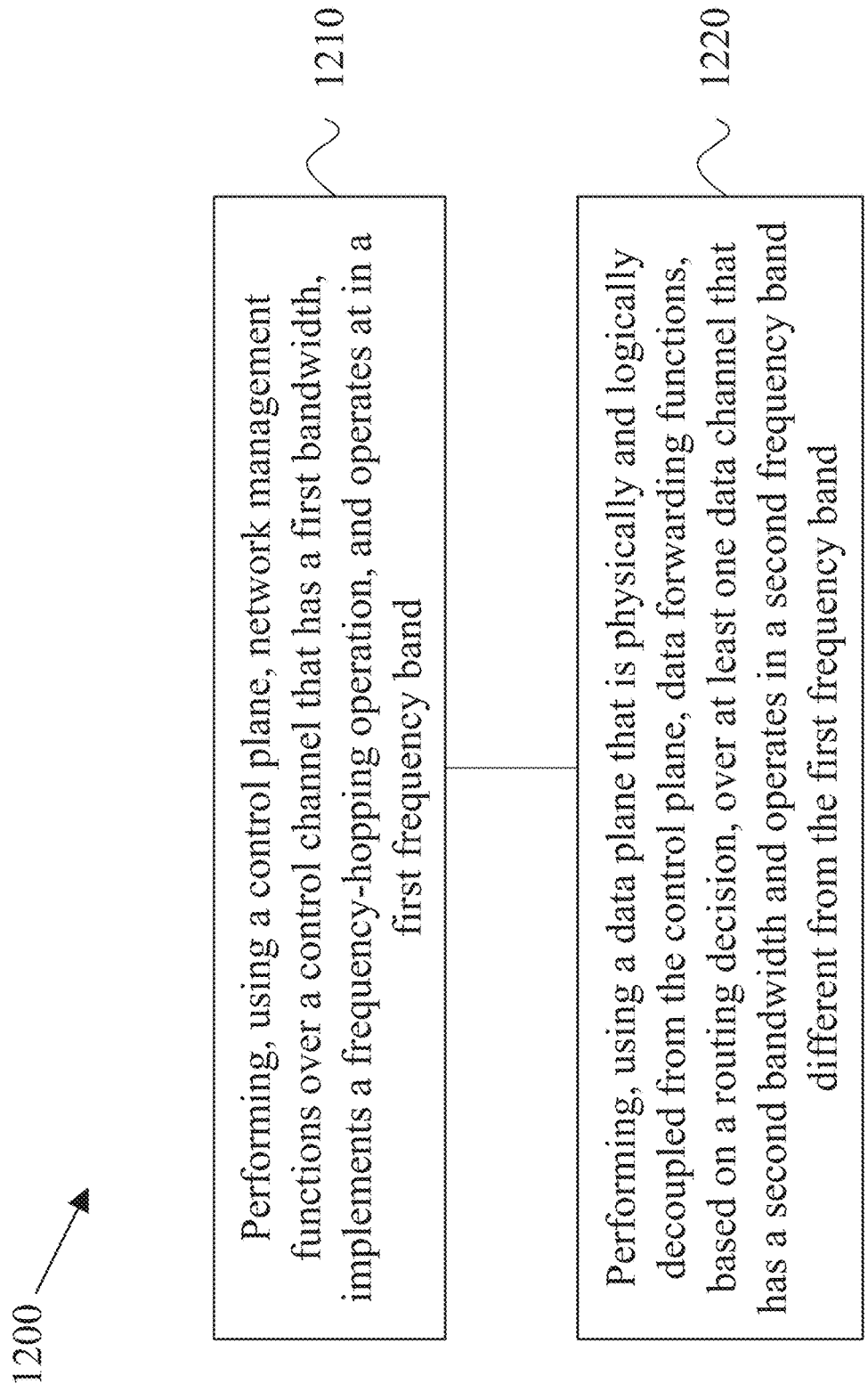
FIG. 12 shows a flowchart of an example method for wireless communication.

FIG. 12 is a flowchart of an example method 1200 for wireless communication. The method 1200 includes, at operation 1210, performing, using a control plane, network management functions over a control channel that has a first bandwidth, implements a frequency-hopping operation, and operates at in a first frequency band.

In some embodiments, the method 1200 may be configured to use a spreading operation instead of the frequency-hopping operation.

The method 1200 includes, at operation 1220, performing, using a data plane that is physically and logically decoupled from the control plane, data forwarding functions, based on a routing decision, over at least one data channel that has a second bandwidth and operates in a second frequency band different from the first frequency band.

In some embodiments, the network management functions comprise establishing the routing decision (e.g., as described in Section 2.1).

In some embodiments, the data channel and the control channel are configured with communication parameters such that a fixed level of a channel or jamming impairment degrades a performance of the data channel to a greater extent than a performance of the control channel (e.g., as described in Section 2.1).

In some embodiments, the control channel is further configured to measure one or more channel characteristics in a third frequency band that is adjacent to the second frequency band (e.g., as described in Section 3).

Embodiments of the disclosed technology provide an apparatus for wireless communication in a network comprising a plurality of network elements, the apparatus comprising a control plane configured to perform network management functions over a control channel that has a first bandwidth, implements a frequency-hopping operation (or a spreading operation), and operates at in a first frequency band, and a data plane, physically and logically decoupled from the control plane, configured to perform data forwarding functions, based on a routing decision, over at least one data channel that has a second bandwidth and operates in a second frequency band different from the first frequency band, the network management functions comprising establishing the routing decision, the data channel and the control channel being configured with communication parameters such that a fixed level of a channel or jamming impairment degrades a performance of the data channel to a greater extent than a performance of the control channel, and the control channel being further configured to measure one or more channel characteristics in a third frequency band that is adjacent to the second frequency band.

In some embodiments, the first frequency band comprises a portion of a ultra-high frequency (UHF) band between 300 MHz and 3 GHz or a very-high frequency (VHF) band between 30 MHz and 300 MHz, and wherein the second frequency band comprises a portion of the UHF band, an L-band between 1 GHz and 2 GHz, an S-band between 2 GHz and 4 GHz or a C-band between 4 GHz and 8 GHz (e.g., as described in Section 2.1).

In some embodiments, the first bandwidth, prior to the frequency-hopping operation (or the spreading operation), is between 1 kHz and 100 kHz, and wherein the second bandwidth is between 1 MHz and 100 MHz (e.g., as described in Section 2.1).

In some embodiments, the apparatus further comprises a control plane interface, coupled to the control plane, configured to provide multi-hop connectivity among the plurality of network elements, and a plurality of data plane interfaces, each data plane interface being coupled to the data plane and configured to provide a physical layer (PHY) waveform to support the data forwarding functions over the at least one data channel (e.g., as described in Section 2.1).

In some embodiments, the plurality of data plane interfaces share a single flow table for the data forwarding functions (e.g., as described in Section 2.1).

In some embodiments, the control plane is further configured to offload critical narrowband traffic from the at least one data channel to the control channel (e.g., as described in Section 4.11).

In some embodiments, the control channel is configured to sense a quality of wireless links between pairs of the plurality of network elements and disseminate information associated with the quality of the wireless links across the network (e.g., as described in Section 3).

In some embodiments, the control channel is configured to receive a quality of wireless links (e.g., link metrics) between pairs of the plurality of network elements and disseminate information associated with the quality of the wireless links across the network (e.g., as described in Section 3).

In some embodiments, sensing the quality of the wireless links comprises an active sensing operation that comprises transmitting a narrowband probe over the control channel that is adjacent to the at least one data channel and generating a link quality metric (e.g., as described in Section 3).

In some embodiments, sensing the quality of the wireless links comprises a passive sensing operation that comprises tuning to the at least one data channel, collecting samples and generating a power level measurement or a link quality metric (e.g., as described in Section 3).

In some embodiments, disseminating the information comprises transmitting a broadcast message that includes a link identification and a corresponding link quality metric (e.g., as described in Section 2.4).

In some embodiments, the link quality metric comprises a signal-to-noise-plus-interference ratio (SINR) (e.g., as described in Section 3).

In some embodiments, the data forwarding functions are updated based on the one or more channel characteristics (e.g., as described in Section 2.5).

In some embodiments, the updating comprises providing at least one of route information or hop limitations (e.g., as described in Section 2.5).

In some embodiments, the data forwarding functions are performed concurrently with measuring the one or more channel characteristics, and wherein interference mitigation is performed to reduce an impact of the measuring on the data forwarding functions (e.g., as described in Section 3).

In some embodiments, the control channel is further configured to disseminate network-wide metrics that include position-location information (PLI) associated with a plurality of network elements in the network, time synchronization information, network topology information and the one or more channel characteristics (e.g., as described in Section 3).

In some embodiments, the one or more channel characteristics comprise a signal-to-noise-plus-interference ratio (SINR), an interference level, a channel propagation characteristic or an indication of an angle-of-arrival (AoA) (e.g., as described in Section 3).

In some embodiments, the data plane is further configured to access a first plurality of frequency channels within a frequency band, and wherein the control plane is further configured to access a second plurality of frequency channels within the frequency band using the frequency-hopping operation (e.g., as described in Section 3).

In some embodiments, the first plurality of frequency channels is accessed using a first channel of a multi-channel radio, and the second plurality of frequency channels is accessed using a second channel of the multi-channel radio (e.g., as described in Section 2.1).

In some embodiments, the first plurality of frequency channels is accessed at a first time using one channel of a multi-channel radio, and the second plurality of frequency channels is accessed at a second time using the one channel of the multi-channel radio (e.g., as described in Section 2.1).

In some embodiments, the control channel is further configured to sense a quality and directionality of individual links between pairs of the plurality of network elements, and disseminate information associated with the directionality across the network, wherein the information comprises a directional link-quality metric with a maximum signal-to-interference-plus-noise (SINR) ratio and a hop counter (e.g., as described in Section 4.2).

In some embodiments, the control plane is further configured to generate a centrality metric for each of the plurality of network elements, wherein the centrality metric is a measure of an efficacy of a network element to perform centralized functions. In other embodiments, the centrality metric comprises a degree centrality, a closeness centrality, an in-betweenness centrality, or a Laplacian centrality (e.g., as described in Section 4.3).

In some embodiments, the control channel is further configured to generate transport attributes for each of the at least one data channel, and the control plane is configured to switch traffic from a first of the at least one data channel to a second of the at least one data channel based on the transport attributes (e.g., as described in Section 4.6).

In some embodiments, the transport attributes comprise at least one of bandwidth, message completion rate, data rate, minimum latency, information security level, local queue build-up, remote queue build-up or gateway connectivity (e.g., as described in Section 4.6).

In some embodiments, the control channel is further configured to perform a network time acquisition function at a medium access (MAC) layer, and provide a high-precision network time reference to the at least one data channel (e.g., as described in Section 4.7).

In some embodiments, the control plane is further configured to generate a fidelity score for each hopping pattern of the frequency-hopping operation, and wherein the data plane is further configured to perform the data forwarding functions over at least one of the first plurality of frequency channels based on the fidelity score (e.g., as described in Section 4.11).

In some embodiments, the control plane is further configured to compute an aggregate fidelity score based on the fidelity score for each of a plurality of hopping patterns of the frequency-hopping operation, and wherein an operation of the control channel within the frequency band is based on the aggregate fidelity score (e.g., as described in Section 4.11).

Figure 13:
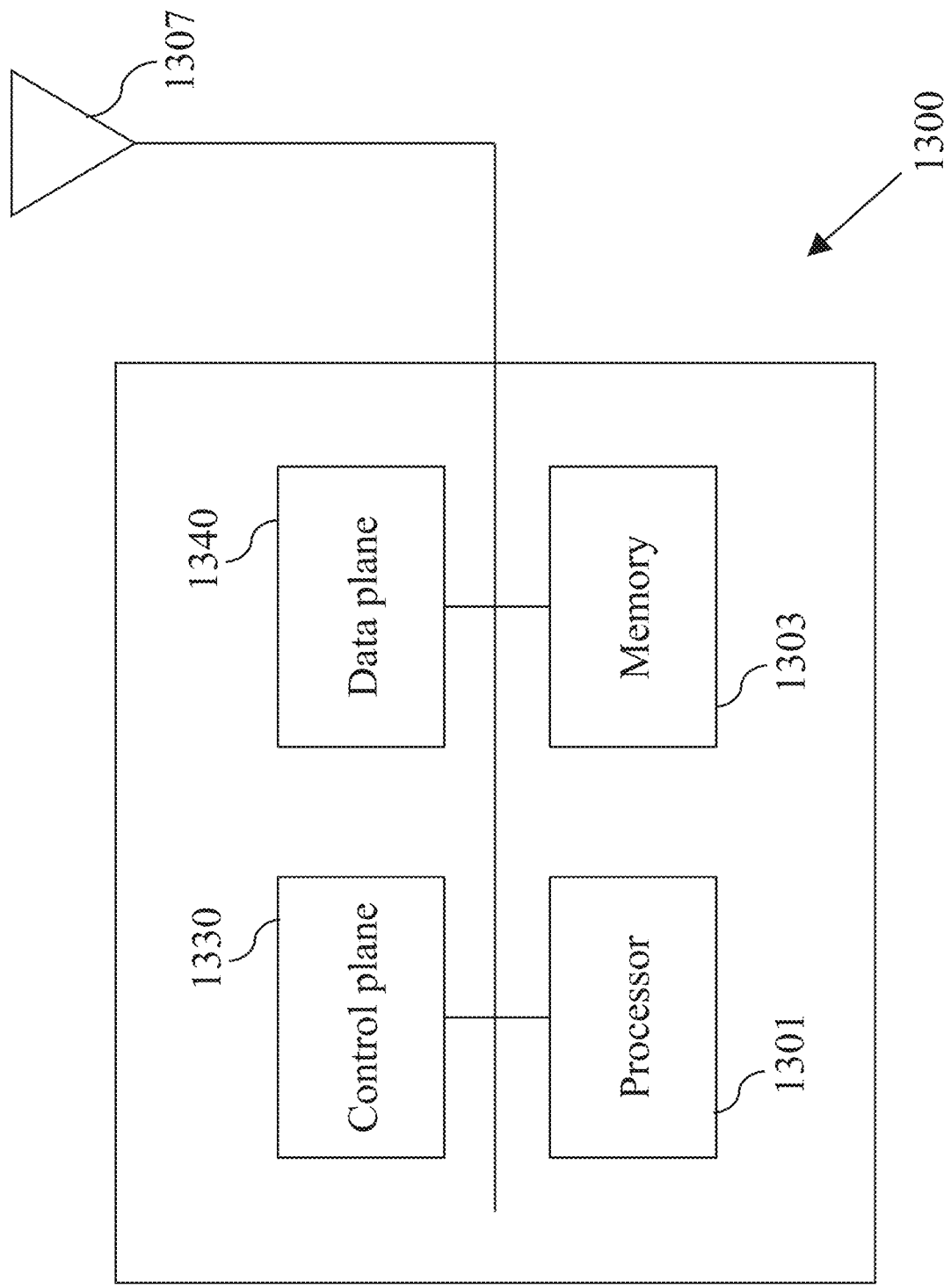
FIG. 13 is a block diagram representation of a portion of an apparatus that may implement a method or technique described in this patent document.

FIG. 13 is a block diagram representation of a portion of an apparatus, in accordance with some embodiments of the presently disclosed technology. An apparatus 1300 can include a processor 1301 (e.g., a microprocessor) that implements one or more of the techniques presented in this document. Apparatus 1300 can include one or more memories 1303 configured to store information such as data and/or instructions. The apparatus 1300 can further include a control plane 1330 and a data plane 1340 that is communicatively coupled to the processor 1301 and the memory 1303. In some embodiments, the apparatus 1300 may be further configured to send and/or receive wireless signals over one or more communication interfaces such as antenna(s) 1320. In some embodiments, at least some of the disclosed techniques, modules or functions are implemented using the apparatus 1300.

In some embodiments, data-plane components are ASIC, network-processor, or general-purpose processor-based devices that handle all data path operations, whereas control-plane components are typically based on general-purpose processors that provide control functionality such as the processing of routing or signaling protocols.

In some embodiments, data-plane components and control-plane components in the SD-H-MANET are implemented in different software modules.

In some embodiments, and as described above, the disclosed technology can be implemented in a multi-channel radio, wherein the control plane functionality and the data plane functionality can be multiplexed in time, in frequency, in code (e.g., CDMA) and the like.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus for wireless communication, comprising:
   a control plane configured to perform a sensing operation in a control channel that has a first bandwidth and operates in a first frequency band, at least one data channel that has a second bandwidth and operates in a second frequency band different from the first frequency band, or a third frequency band that is adjacent to the second frequency band; and
   a data plane configured to perform a data forwarding function, based on a result of the sensing operation, over the at least one data channel,
   wherein the at least one data channel and the control channel are configured with communication parameters such that a same level of a channel or jamming impairment degrades a performance of the at least one data channel to a greater extent than a performance of the control channel.

2. The apparatus of claim 1, wherein the first frequency band comprises a portion of a ultra-high frequency (UHF) band between 300 MHz and 3 GHz or a very-high frequency (VHF) band between 30 MHz and 300 MHz, and wherein the second frequency band comprises a portion of the UHF band, an L-band between 1 GHz and 2 GHz, an S-band between 2 GHz and 4 GHz or a C-band between 4 GHz and 8 GHz.

3. The apparatus of claim 1, wherein the sensing operation is a passive sensing operation.

4. The apparatus of claim 3, wherein the sensing operation comprises:
   determining at least one channel characteristic of the at least one data channel; and
   passively digitizing, based on the at least one channel characteristic, an interference or noise environment in the at least one data channel.

5. The apparatus of claim 4, wherein the sensing operation further comprises:
   generating, based on processing samples of the interference or noise environment, a link quality metric comprising at least one of a transfer completion rate, an acknowledgement (ACK) message, a negative acknowledgement (NACK) message, or a data service latency.

6. The apparatus of claim 1, wherein the sensing operation is an active sensing operation.

7. The apparatus of claim 6, wherein the sensing operation comprises:
transmitting, in the third frequency band, at a regular interval, a narrowband probe sequence with a radio identifier.

8. A method of wireless communication, comprising:
performing, using a control plane, a sensing operation in a control channel that has a first bandwidth and operates in a first frequency band, at least one data channel that has a second bandwidth and operates in a second frequency band different from the first frequency band, or a third frequency band that is adjacent to the second frequency band; and
performing, using a data plane, a data forwarding function, based on a result of the sensing operation, over the at least one data channel,
wherein the at least one data channel and the control channel are configured with communication parameters such that a same level of a channel or jamming impairment degrades a performance of the at least one data channel to a greater extent than a performance of the control channel.

9. The method of claim 8, wherein the first frequency band comprises a portion of a ultra-high frequency (UHF) band between 300 MHz and 3 GHz or a very-high frequency (VHF) band between 30 MHz and 300 MHz, and wherein the second frequency band comprises a portion of the UHF band, an L-band between 1 GHz and 2 GHz, an S-band between 2 GHz and 4 GHz or a C-band between 4 GHz and 8 GHz.

10. The method of claim 8, wherein the sensing operation is a passive sensing operation.

11. The method of claim 10, wherein the sensing operation comprises:
determining at least one channel characteristic of the at least one data channel; and
passively digitizing, based on the at least one channel characteristic, an interference or noise environment in the at least one data channel.

12. The method of claim 11, wherein the sensing operation further comprises:
generating, based on processing samples of the interference or noise environment, a link quality metric comprising at least one of a transfer completion rate, an acknowledgement (ACK) message, a negative acknowledgement (NACK) message, or a data service latency.

13. The method of claim 8, wherein the sensing operation is an active sensing operation that comprises:
transmitting, in the third frequency band, at a regular interval, a narrowband probe sequence with a radio identifier.

14. A non-transitory computer-readable medium, having stored thereon, instructions that when executed by a computing device, cause the computing device to perform a wireless communication method, the instructions comprising:
instructions for performing, using a control plane, a sensing operation in a control channel that has a first bandwidth and operates in a first frequency band, at least one data channel that has a second bandwidth and operates in a second frequency band different from the first frequency band, or a third frequency band that is adjacent to the second frequency band; and
instructions for performing, using a data plane, a data forwarding function, based on a result of the sensing operation, over the at least one data channel,
wherein the at least one data channel and the control channel are configured with communication parameters such that a same level of a channel or jamming impairment degrades a performance of the at least one data channel to a greater extent than a performance of the control channel.

15. The non-transitory computer-readable medium of claim 14, wherein the first frequency band comprises a portion of a ultra-high frequency (UHF) band between 300 MHz and 3 GHz or a very-high frequency (VHF) band between 30 MHz and 300 MHz, and wherein the second frequency band comprises a portion of the UHF band, an L-band between 1 GHz and 2 GHz, an S-band between 2 GHz and 4 GHz or a C-band between 4 GHz and 8 GHz.

16. The non-transitory computer-readable medium of claim 14,
wherein the sensing operation is a passive sensing operation.

17. The non-transitory computer-readable medium of claim 16, wherein the instructions for performing the sensing operation comprise:
instructions for determining at least one channel characteristic of the at least one data channel; and
instructions for passively digitizing, based on the at least one channel characteristic, an interference or noise environment in the at least one data channel.

18. The non-transitory computer-readable medium of claim 17, wherein the instructions for performing the sensing operation further comprise:
instructions for generating, based on processing samples of the interference or noise environment, a link quality metric comprising at least one of a transfer completion rate, an acknowledgement (ACK) message, a negative acknowledgement (NACK) message, or a data service latency.

19. The non-transitory computer-readable medium of claim 14, wherein the sensing operation is an active sensing operation.

20. The non-transitory computer-readable medium of claim 19, wherein the instructions for performing the sensing operation comprise:
instructions for transmitting, in the third frequency band, at a regular interval, a narrowband probe sequence with a radio identifier.

* * * * *